(12) United States Patent
Takahashi et al.

(10) Patent No.: US 8,451,477 B2
(45) Date of Patent: May 28, 2013

(54) IMAGE FORMING APPARATUS, PRINTING METHOD, PUBLICIZED INFORMATION AGGREGATING APPARATUS AND METHOD, AND COMPUTER-READABLE STORAGE MEDIUM FOR COMPUTER PROGRAM

(75) Inventors: Kazusei Takahashi, Nishinomiya (JP); Hisashi Uchida, Kuze-gun (JP); Yoshiyuki Tamai, Itami (JP); Masaya Hashimoto, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1112 days.

(21) Appl. No.: 12/402,689

(22) Filed: Mar. 12, 2009

(65) Prior Publication Data

US 2009/0310164 A1 Dec. 17, 2009

(30) Foreign Application Priority Data

Jun. 16, 2008 (JP) ................................. 2008-157265

(51) Int. Cl.
*G06F 3/12* (2006.01)
*G06G 15/00* (2006.01)

(52) U.S. Cl.
USPC .......... 358/1.15; 358/1.1; 358/1.14; 358/1.9; 717/175; 717/172; 709/203

(58) Field of Classification Search
None
See application file for complete search history.

(56) References Cited

U.S. PATENT DOCUMENTS

| 6,973,206 | B2* | 12/2005 | Lo .................................. 382/124 |
| 7,917,490 | B2* | 3/2011 | Norris et al. ................... 707/707 |
| 8,130,396 | B2* | 3/2012 | Ikegami et al. ............... 358/1.15 |
| 2002/0083132 | A1* | 6/2002 | Holland et al. ................ 709/203 |
| 2004/0184043 | A1* | 9/2004 | Hirosugi et al. ................ 358/1.1 |
| 2006/0259499 | A1* | 11/2006 | Moulckers et al. ........... 707/100 |
| 2007/0049058 | A1* | 3/2007 | Kobayashi ...................... 439/13 |
| 2007/0139698 | A1* | 6/2007 | Sato .............................. 358/1.15 |
| 2007/0174298 | A1* | 7/2007 | Tanimoto ........................ 707/10 |
| 2007/0206213 | A1* | 9/2007 | Kuroki .......................... 358/1.15 |
| 2008/0065664 | A1* | 3/2008 | Kehn et al. .................... 707/101 |

(Continued)

FOREIGN PATENT DOCUMENTS

| JP | 2000-284919 A | 10/2000 |
| JP | 2002-189394 A | 7/2002 |

(Continued)

OTHER PUBLICATIONS

Notification of Reason(s) for Refusal issued in the corresponding Japanese Patent Application No. 2008-157265 dated Apr. 20, 2010, and an English Translation thereof.

*Primary Examiner* — Satwant Singh
(74) *Attorney, Agent, or Firm* — Buchanan Ingersoll & Rooney PC

(57) ABSTRACT

An image forming apparatus is provided with a browsing setting table storage portion for storing a keyword specified by a user, an update presence/absence determination portion for retrieving, from information publicized through a server, publicized information that includes updated or newly added contents and that also includes the keyword stored in the browsing setting table storage portion, and a printing control portion for controlling a printing unit to print the publicized information thus retrieved.

23 Claims, 30 Drawing Sheets

U.S. PATENT DOCUMENTS

| | | | |
|---|---|---|---|
| 2008/0130041 A1* | 6/2008 | Asahara | 358/1.15 |
| 2008/0172370 A1* | 7/2008 | Farouki | 707/5 |
| 2008/0297848 A1* | 12/2008 | Mizutani et al. | 358/1.16 |
| 2009/0009816 A1* | 1/2009 | Hagiwara | 358/403 |
| 2009/0019028 A1* | 1/2009 | Norris et al. | 707/5 |
| 2009/0204610 A1* | 8/2009 | Hellstrom et al. | 707/5 |
| 2012/0120451 A1* | 5/2012 | Ikegami et al. | 358/1.15 |
| 2012/0266156 A1* | 10/2012 | Spivak et al. | 717/172 |
| 2012/0266158 A1* | 10/2012 | Spivak et al. | 717/175 |

FOREIGN PATENT DOCUMENTS

| | | |
|---|---|---|
| JP | 2002-268831 A | 9/2002 |
| JP | 2003-209650 A | 7/2003 |
| JP | 2004-021453 A | 1/2004 |
| JP | 2004-186780 A | 7/2004 |
| JP | 2007-156713 A | 6/2007 |
| JP | 2007-199998 | 8/2007 |
| JP | 2007-299275 | 11/2007 |

* cited by examiner

FIG. 4

```
<?xml version="1.0" encoding="Shift_JIS" ?>
<rss version="2.0">
<channel>

<title>ABC weekly magazine online version</title>
<link>http://www.example1.xxx/</link>
<description>Providing you with ABC weekly magazine digest online. Updated on every Monday.</description>
<pubDate>Mon, 28 Jun 2007 10:00:00 +0900</pubDate>
<lastBuildDate>Mon, 28 Jun 2007 13:00:00 +0900</lastBuildDate>

<item>
<title>Special Topic 1: Zero in on the popularity of light cars</title>
<description>Auto manufacturers announce new light cars one after another. What's the secret hidden in the popularity of light cars?</description>
<link>http://www.example1.xxx/20070528/001</link>
<pubDate>Mon, 28 Jun 2007 10:00:00 +0900</pubDate>
<lastBuildDate>Mon, 28 Jun 2007 13:00:00 +0900</lastBuildDate>
</item>

<item>
<title>Special Topic 2: Revision of Road Traffic Law and thereafter</title>
<description>How towns have changed after the revision of Road Traffic Law</description>
<link>http://www.example1.xxx/20070528/002</link>
<pubDate>Mon, 28 Jun 2007 10:00:00 +0900</pubDate>
<lastBuildDate>Mon, 28 Jun 2007 12:00:00 +0900</lastBuildDate>
</item>

...

</channel>
</rss>
```

USER CODE: U0001

| Browsing Code | Site Name | URL | Keyword(s) | Category |
|---|---|---|---|---|
| C001 | AB Electronics | http://www.AAA-denki.....com/ad.rdf | Flat TV and Special Offer | Electronics store |
| C002 | CD Cameras | http://www.BBB-camara......net/rss.xml | Flat TV and Special Offer | Electronics store |
| C003 | EF Sports | http://www.CCC-sports......com/teniss_info.xml | Tennis | Hobby |
| C004 | GH Business | http://www.DDD-business......com/market.rdf | Marketing or Management | Business |
| C005 | IJ Securities | http://www.EEE-securities......net/index.rdf | Seminar or Lecture | Finance |
| C006 | KL Musics | http://www.FFF-music......net/classic.rdf | Classical music or Opera | Hobby |
| C007 | MN Books | http://www.GGG-bookstore......net/classic.rdf | Marketing or Management or Mr. ABC | Business |
| C008 | OP Bank | http://www.HHH-bank......net/stock.rdf | Mutual fund or Foreign exchange | Finance |
| C009 | QR Software | http://www.III-computer......net/secondhand.xml | Second hand or XYZ application | Electronics store |
| C010 | ST Tickes | http://www.JJJ-ticket......com/schedule.rdf | Classical music or Opera | Hobby |

6a (column marker for each row)

1. GH Business    http://www.DDD-business ··· .com/market.rdf  ← GB
   Special Features of September Issue 2. MN Books    http://www.GGG-bookstore ··· .net/classic.rdf
   Introduction of Best-Selling Books of the Month Change in TV Set Retail Price AB Department
ABC DEF 1 Introduction
1.1 Mainstream Type Recently, ——  ← GA 3. KL Music    http://www.FFF-music ··· .net/classic.rdf  ← GB
   New Records in September p.1

FIG. 7A  OBVERSE SIDE

CHANGE IN TV SET RETAIL PRICE:
AB DEPARTMENT
ABC DEF

1 INTRODUCTION
1.1 MAINSTREAM TYPE

RECENTLY, _____
_____
_____
_____
_____
_____
_____.

GA

FIG. 7B  REVERSE SIDE

PF

| CATEGORY "ELECTRONICS STORE" | CATEGORY "HOBBY" |
|---|---|
| 1. AB ELECTRONICS | 1. KL MUSIC |
| http://www.AAA-denki.‥‥.com/ad.rdf | http://www.FFF-music.‥‥.net /classic.rdf |
| WEB PRINTING AVAILABLE (P. 2) | NEW RECORDS IN SEPTEMBER |
| 2. CD CAMERAS | 2. ST TICKETS |
| http://www.BBB-camara.‥‥.net /rss.xml | http://www.JJJ-ticket.‥‥.com /schedule.rdf |
| NOTICE: WEEKEND SPECIAL PRICE OFFER FOR DIGITAL CAMERAS ! | WEB PRINTING AVAILABLE (P. 3) |
| CATEGORY "BUSINESS" | CATEGORY "FINANCE" |
| 1. GH BUSINESS | 1. IJ SECURITIES |
| http://www.DDD-business.‥‥.com /market.rdf | http://www.EEE-securities.‥‥.net /index.rdf |
| SPECIAL FEATURES OF SEPTEMBER ISSUE | WEB PRINTING AVAILABLE (P. 4) |
| 2. MN BOOKS | |
| http://www.GGG-bookstore.‥‥.net /classic.rdf | |
| BEST SELLER BOOKS OF LAST MONTH | |

| AB ELECTRONICS SEPTEMBER CLEARING SALES | OPERA CONCERT "THE MARRIAGE OF FIGARO" |
|---|---|
| FLAT TELEVISION SPECIAL SET<br><br>ABC-MADE<br>  42-INCH LCD<br>  DVD RECORDER<br>  RACK FOR SURROUND-<br>  SOUND SYSTEM<br>------------<br>123,456 yen | ABC ORCHESTRA<br><br>SOPRANO: ABC<br>TENOR: DEF<br>BARITONE: GHI<br>CONDUCTOR: JKL<br><br>SEAT S: 9,000 yen<br>SEAT A: 6,000 yen |
| IJ SECURITIES<br><br>NOTICE: INVESTMENT SEMINAR<br><br>SEPTEMBER 00<br>AT AB BRANCH OFFICE<br>    (4:00 P.M. TO 5:30 P.M.)<br>LECTURER<br>  MR. ABC,<br>  INVESTMENT ADVISOR,<br>  IJ SECURITIES | |

FIG. 9
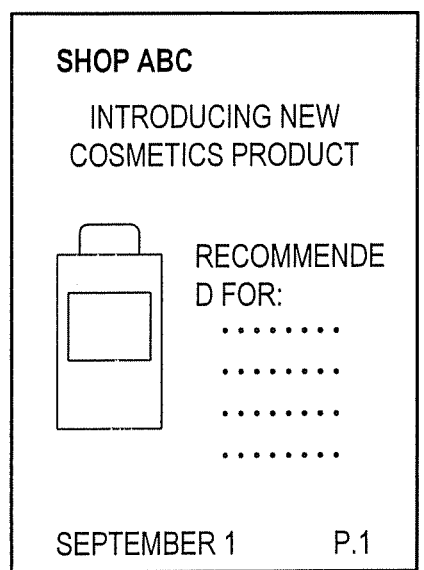
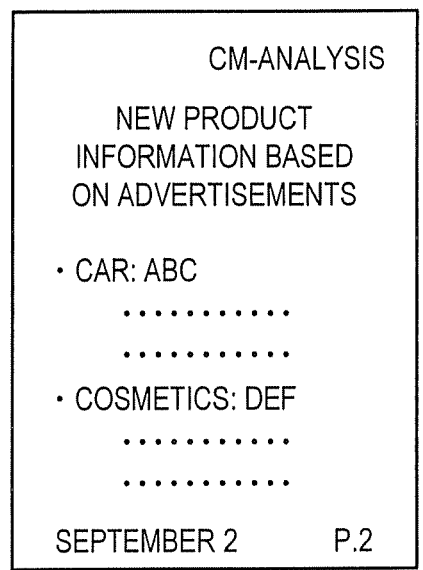

FIG. 10

USER CODE: U0001

○ SETTING FOR LIST PRINT

| CONDITION NAME | SET DETAILS |
|---|---|
| LIST PRINT | YES |
| CATEGORY CLASSIFICATION PRINT | YES |
| PRINT SIDE | REVERSE SIDE |

○ SETTING FOR WEB PRINTING/STORING/TRANSFERRING

| CONDITION NAME | SET DETAILS |
|---|---|
| KEYWORD REFINED PRINTING/ STORING/TRANSFERRING | YES |
| CATEGORY REFINED PRINTING/ STORING/TRANSFERRING | YES |
| TARGET CATEGORY | ELECTRONICS STORE, HOBBY, BUSINESS, FINANCE |
| PRINT SIDE | REVERSE SIDE |
| BOX STORAGE | YES |
| FILE NAME | LATEST ARTICLE DOCUMENT. PDF |
| TRANSFER DESTINATION | SERVER, E-MAIL ATTACHMENT |
| ADDRESS | 92.168.1.101, hanako@aaa.-.com |
| TRIGGER CONDITION SETTING FOR PRINTING/STORING/TRANSFERRING | NO |
| TARGET RSS SITE | |
| KEYWORD | |
| FILE COMBINING PROCESSING | NO |
| OBTAINING PERIOD | |
| ADDING METHOD | |

FIG. 11

○ SETTING FOR LIST PRINT
◎ PRINT SETTING:

| LIST PRINT | □YES | □NO | |
|---|---|---|---|
| CATEGORY CLASSIFICATION PRINT | □YES | □NO | |
| PRINT SIDE | □MARGIN SPACE ON OBVERSE SIDE | | □REVERSE SIDE |

○ SETTING FOR WEB PRINTING/STORING/TRANSFERRING

| KEYWORD REFINED PRINTING/STORING/TRANSFERRING | □YES | □NO |
|---|---|---|
| CATEGORY REFINED PRINTING/STORING/TRANSFERRING | □YES | □NO |
| | TARGET CATEGORY ( ) | |
| PRINT SIDE | □OBVERSE SIDE | □REVERSE SIDE |
| STORING BOX | □BOX ( ) | |
| | FILE NAME ( ) | |
| TRANSFER DESTINATION | □SERVER | □E-MAIL ATTACHMENT |
| | ADDRESS ( ) | |
| TRIGGER CONDITION SETTING FOR PRINTING/STORING/TRANSFERRING | □YES | □NO |
| | TARGET RSS SITE ( ) | |
| | KEYWORD ( ) | |
| FILE COMBINING PROCESSING | □YES | □NO |
| | OBTAINING PERIOD ( ) | |
| | □ADD FORWARD | □ADD BACKWARD |

[ OK ]  [ CANCEL ]

FIG. 23

| BROWSING CODE | SITE NAME | URL | KEYWORD(S) | CATEGORY |
|---|---|---|---|---|
| C021 | UV CINEMA | http://www.KKK-theaters. ... .com/movies.rdf | UMEDA | HOBBY |

| CONDITION NAME | SET DETAILS |
|---|---|
| KEYWORD REFINED PRINTING/ STORING/TRANSFERRING | YES |
| CATEGORY REFINED PRINTING/ STORING/TRANSFERRING | YES |
| TARGET CATEGORY | HOBBY |
| PRINT SIDE | OBVERSE SIDE |
| BOX STORAGE | NO |
| FILE NAME | |
| TRANSFER DESTINATION | NO |
| ADDRESS | |
| TRIGGER CONDITION SETTING FOR PRINTING/STORING/TRANSFERRING | YES |
| TARGET RSS SITE | http://www.XXX-weather. ... .com/osaka.rdf |
| KEYWORD | (SATURDAY OR SUNDAY) AND RAIN |
| FILE COMBINING PROCESSING | NO |
| OBTAINING PERIOD | |
| ADDING METHOD | |

| BROWSING CODE | SITE NAME | URL | KEYWORD(S) | CATEGORY |
|---|---|---|---|---|
| C021 | GH BUSINESS | http://www.DDD-business. ... .com/market.rdf | COSMETICS AND NEW PRODUCTS | MARKETING |
| C022 | GH BUSINESS | http://www.DDD-business. ... .com/market.rdf | COSMETICS AND MANAGEMENT | MANAGEMENT |
| C023 | ABC COSMETICS | http://www.LLL-shop. ... .com/items.rdf | COSMETICS AND NEW PRODUCTS | MARKETING |
| C024 | DEF COMMUNITY | http://www.kuchikomi-perfume. ... .com/ikenxml | COSMETICS AND NEW PRODUCTS | MARKETING |
| C025 | GHI COMPANY INFORMATION | http://www.MMM-kaisha-joho. ... .com/cosme.rdf | COSMETICS AND MANAGEMENT | MANAGEMENT |
| C026 | DEF COMMUNITY | http://www.kuchikomi-perfume. ... .com/ikenxml | COSMETICS AND NEW PRODUCTS | MARKETING |
| C027 | CM-ANALIZE | http://www.NNN-CM-analize ... .com/report.rdf | COSMETICS AND NEW PRODUCTS | MARKETING |

6a (rows)

| CONDITION NAME | SET DETAILS |
|---|---|
| KEYWORD REFINED PRINTING/STORING/TRANSFERRING | YES |
| CATEGORY REFINED PRINTING/STORING/TRANSFERRING | YES |
| TARGET CATEGORY | MARKETING |
| PRINT SIDE | OBVERSE SIDE |
| BOX STORAGE | NO |
| FILE NAME | |
| TRANSFER DESTINATION | NO |
| ADDRESS | |
| TRIGGER CONDITION SETTING FOR PRINTING/STORING/TRANSFERRING | NO |
| TARGET RSS SITE | |
| KEYWORD | |
| FILE COMBINING PROCESSING | YES |
| OBTAINING PERIOD | SEPTEMBER 1, 2007 – SEPTEMBER 30, 2007 |
| ADDING METHOD | ADD BACKWARD |

FIG. 30

| PRINT | |
|---|---|
| ○ PRINTING DOCUMENT: ABCDEF | |
| ○ PRINTER | |
| NAME: MFP_001 | |
| PAGES | ☐ ALL<br>☐ FROM: ( 1 ) TO: ( 20 ) |
| PRINT FORMAT | ☐ SINGLE-SIDED ☐ DUPLEX<br>☐ NO PAGE LAYOUT ☐ 2 IN 1 LAYOUT ☐ 4 IN 1 LAYOUT |
| ○ RSS LIST PRINT | ☐ PRINT ☐ NO PRINT<br>☐ OBVERSE SIDE MARGIN SPACE ☐ REVERSE SIDE |
| ○ WEB PRINT | |
| FILE NAME | ( PERFUME-MARKET-2007SEP. ) |
| STORAGE DESTINATION | ☐ BOX<br>☐ SERVER   NAME ( ) |
| PRINT SIDE | ☐ OBVERSE SIDE   ☐ REVERSE SIDE |

PRINT    CANCEL

HG2

IMAGE FORMING APPARATUS, PRINTING METHOD, PUBLICIZED INFORMATION AGGREGATING APPARATUS AND METHOD, AND COMPUTER-READABLE STORAGE MEDIUM FOR COMPUTER PROGRAM

This application is based on Japanese Patent Application No. 2008-157265 filed on Jun. 16, 2008, the contents of which are hereby incorporated by reference.

BACKGROUND OF THE INVENTION

1. Field of the Invention

The present invention relates to an apparatus, a method, and the like for using information publicized through a web server etc. on the Internet.

2. Description of Related Art

Web servers on the Internet were initially used primarily for publicizing academic information. However, in recent years, such servers have been used to publicize information that is updated at a frequency much higher than that of academic information and that includes such information as news flashes, new product announcements, traffic information, weather information, and weblogs.

In addition, much more information has been provided to a user, recently. Accordingly, this urges the user to collect the information more efficiently.

To cope with this, methods such as those described in JP-2000-284919-A, JP-2004-021453-A, and JP2007-156713-A are proposed. According to the method described in JP-2000-284919-A, a power timer management portion manages a state of power in accordance with a schedule that is fed in by a user through a user information input portion and memorized in a memorizing portion. In a page updating method memorizing portion, an internet communication portion is used to access a URL that is set by the user through a URL input portion at a time set by the user through a schedule input portion to thereby obtain page information. The page information thus obtained is compared with contents in the page updating method memorizing portion. If it is updated, the page information is temporarily stored in a temporary memory portion. Then, web page information is interpreted by a print management portion, and, if it is necessary, a print portion makes a print based on settings inputted by the user through a print setting input portion.

According to a method described in JP-2004-021453-A, a printer connects to the Internet, automatically visits and connects to an information processing apparatus corresponding to an URL in accordance with a time and schedule specified by a user, checks whether or not information disclosed by the information processing apparatus is updated, and automatically obtains the updated information for printing.

According to a method described in JP-2007-156713-A, an image processing apparatus, when a fixed-time print job process starts, determines whether or not there is a print job that needs to be printed at the current time. If it is determined that there is such a job, the image processing apparatus, in accordance with a URL specified by the print job, requests a website corresponding to the URL for updated information described in RSS or Atom format and obtains the information. Then, the image processing apparatus determines whether or not a resource of the registered URL has been updated by analyzing the obtained updated information. When it is determined that the resource of the registered URL has been updated, the image processing apparatus obtains a corresponding resource by using that URL, generates an image to be printed based on the obtained resource, and prints the image.

Other documents, JP-2002-189394-A, JP-2002-268831-A, JP-2003-209650, and JP-2004-186780 disclose a method for printing an image specified by a user together with an advertisement.

According to the conventional method as described in JP-2000-284919-A, JP-2004-021453-A, and JP-2007-156713-A, a print is made, even when a tiny fraction of information is updated. However, in recent years when an updating frequency and an amount of information have been rising as described above, a user wishes to obtain information more efficiently.

SUMMARY OF THE INVENTION

Having been conceived in light of the abovementioned problem, it is an object of an embodiment of the present invention to enable a user to obtain information publicized through a web server or the like more efficiently than is conventionally possible.

An image forming apparatus according to one embodiment of the present invention includes a keyword storage portion that stores a keyword specified by a user, a retrieving portion that retrieves, from information publicized through a server, publicized information that includes updated or newly added contents and that also includes the keyword stored in the keyword storage portion, and a printing portion that prints the publicized information thus retrieved by the retrieving portion.

BRIEF DESCRIPTION OF THE DRAWINGS

FIG. 4 illustrates an example of RSS data.

FIG. 5 illustrates an example of a browsing setting table.

FIG. 6 illustrates an example of a page image.

FIGS. 7A and 7B illustrate an example of a page image.

FIG. 8 illustrates an example of a web page image.

FIG. 9 illustrates an example of a document made up of a plurality of web pages.

FIG. 10 illustrates an example of print setting data.

FIG. 11 illustrates an example of a print setting screen.

FIG. 23 illustrates an example of a browsing setting table.

FIG. 24 illustrates an example of web page print condition data.

FIG. 26 illustrates an example of a browsing setting table.

FIG. 27 illustrates an example of web page print condition data.

FIG. 30 illustrates an example of a driver screen.

DESCRIPTION OF THE PREFERRED EMBODIMENTS

Figure 1:
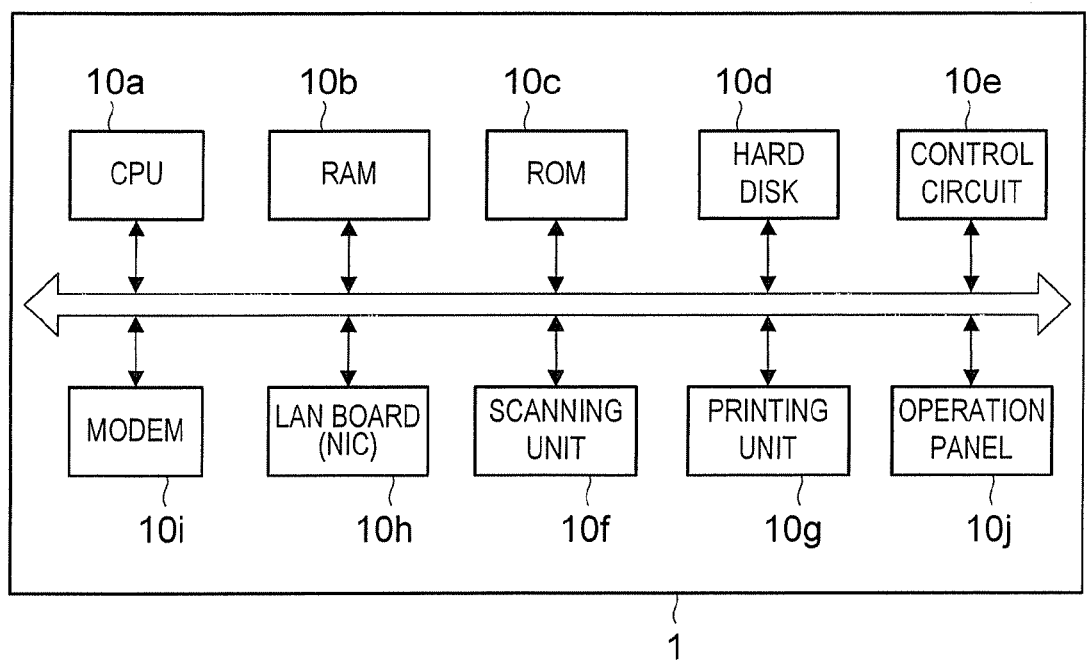
FIG. 1 illustrates an example of a hardware configuration of an image forming apparatus.
Figure 2:
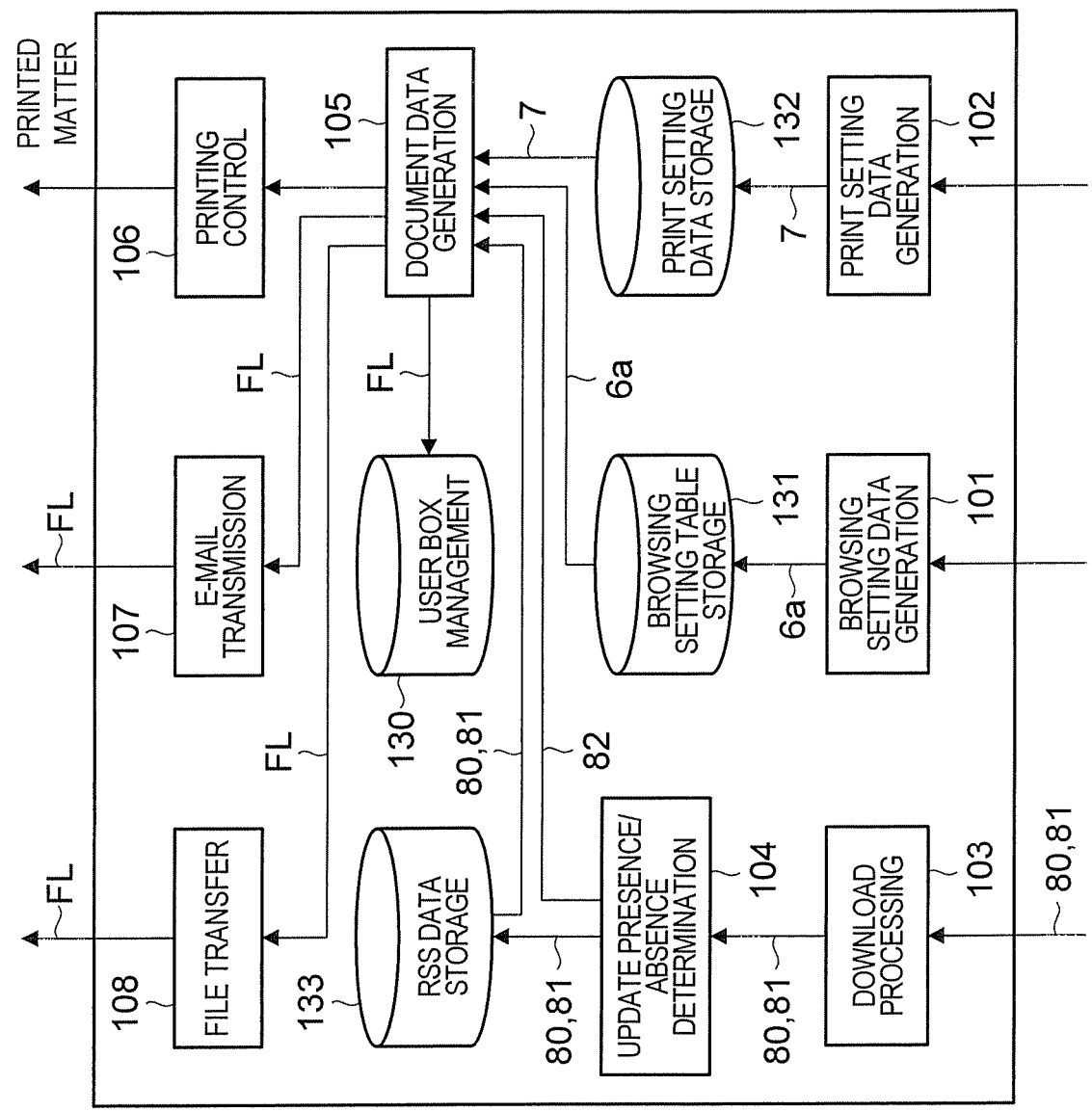
FIG. 2 illustrates an example of a functional configuration of the image forming apparatus.
Figure 3:
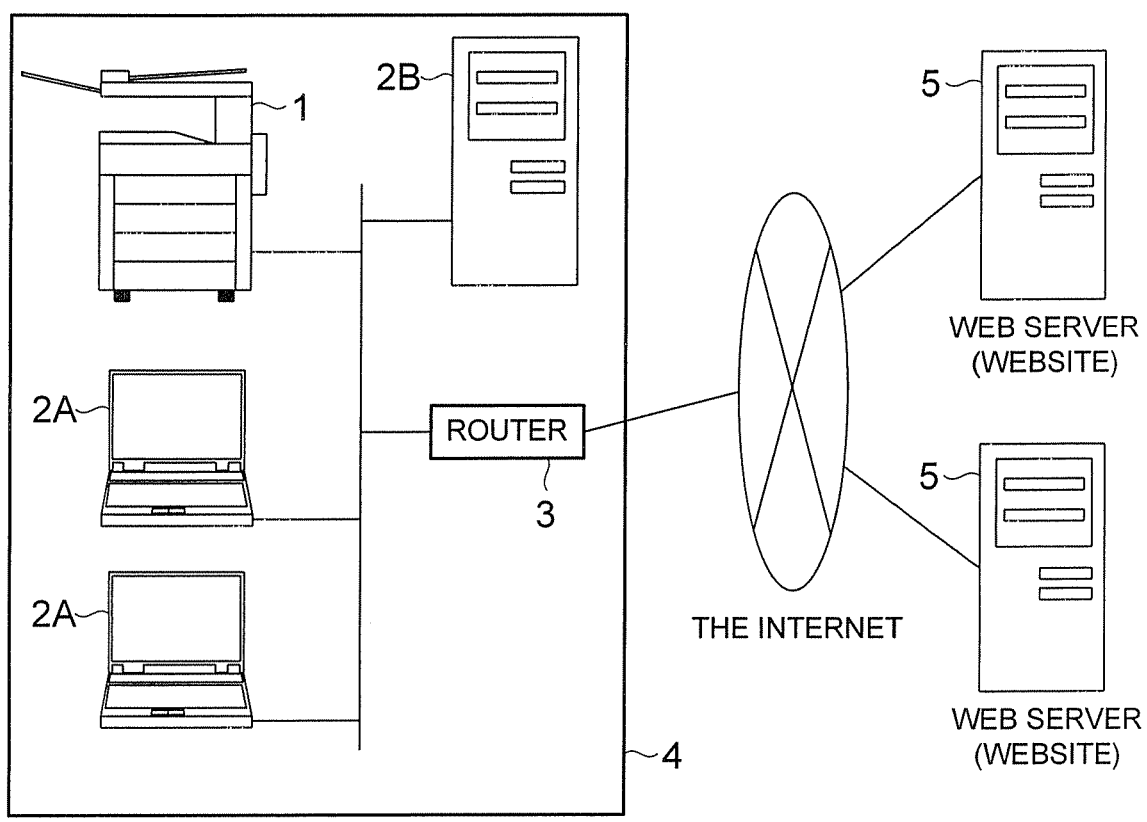
FIG. 3 illustrates an example showing how an intranet is connected to a web server.

FIG. 1 illustrates an example of a hardware configuration of an image forming apparatus 1; FIG. 2 illustrates an example of a functional configuration of the image forming apparatus 1; FIG. 3 illustrates an example showing how an intranet 4 is connected to a web server 5; and FIG. 4 illustrates an example of RSS data.

An image forming apparatus 1, which functions as an image forming apparatus and a publicized information aggregating apparatus, is a device that integrates various functions, such as copying, scanning, faxing, document server (also known as a "box") functions, and network printing (also known as "PC printing"). Such devices are also sometimes called combination machines or MFPs (Multi-Function Peripherals).

The image forming apparatus 1 further has functions as a web browser and an RSS reader, aggregates articles which individual users are interested in from among various articles delivered by websites on the Internet, and outputs or stores such articles in a format according to the users' preferences.

As shown in FIG. 1, the image forming apparatus 1 is configured of a CPU 10a, a RAM 10b, a ROM 10c, a hard disk 10d, a control circuit 10e, a scanning unit 10f, a printing unit 10g, a LAN board 10h, a modem 10i, an operation panel 10j, and so on.

The control circuit 10e is a circuit for controlling the hard disk 10d, the scanning unit 10f, the printing unit 10g, the LAN board 10h, the modem 10i, the operation panel 10j, and so on.

The scanning unit 10f optically reads an image of a document printed on paper, such as text, mathematical equations, symbols, photographs, diagrams, or illustrations, and generates image data thereof.

The printing unit 10g prints, onto paper, an image based on image data obtained by the scanning unit 10f or image data transmitted from a web server, a personal computer, a fax terminal, or the like.

The LAN board 10h is an NIC (Network Interface Card) for communicating with another device using a protocol such as TCP/IP. The modem 10i communicates with a fax terminal using a fax protocol via a public communication line.

The operation panel 10j is a touch panel that displays screens such as a screen for providing messages or instructions to a user, a screen for the user to input a type of process the user desires to be performed as well as processing conditions, a screen that displays the result of processes executed by the CPU 10a. The user can furthermore provide commands, specify processing conditions, and so on to the image forming apparatus 1 by touching predetermined locations on the operation panel 10j. The operation panel 10j therefore serves as a user interface through which the user operates the image forming apparatus 1.

The ROM 10c or the hard disk 10d stores programs and data for implementing, as shown in FIG. 2, a browsing setting data generation portion 101, a print setting data generation portion 102, a download processing portion 103, an update presence/absence determination portion 104, a document data generation portion 105, a printing control portion 106, an E-mail transmission portion 107, a file transfer portion 108, a user box management portion 130, a browsing setting table storage portion 131, a print setting data storage portion 132, an RSS data storage portion 133, and so on.

These programs and data are loaded into the RAM 10b as necessary, whereupon the programs are executed by the CPU 10a. Some or all of the functions shown in FIG. 2 may be implemented by a circuit such as the control circuit 10e.

The CPU 10a performs overall control of the image forming apparatus 1 by executing the programs as shown in the flowchart described later where processing is performed step by step. The CPU 10a also executes other programs as appropriate.

As shown in FIG. 3, the image forming apparatus 1 is provided on an intranet 4 in an organization such as a public office, a business, a school, or the like. In addition to the image forming apparatus 1, devices such as one or a plurality of terminal devices 2A, one or a plurality of file servers 2B, a router 3, and so on are provided on the intranet 4.

The terminal device 2A is a client of the image forming apparatus 1 and is a device for utilizing the scanner, fax, box, and PC print functions of the image forming apparatus 1. A driver for utilizing the image forming apparatus 1 is installed in the terminal device 2A.

Furthermore, an E-mail application, an application for transferring files using a protocol such as FTP (File Transfer Protocol) or SMB (Server Message Block), a web browser, and the like are installed in the terminal device 2A.

A personal computer, workstation, or the like is used as the terminal device 2A.

The router 3 connects the intranet 4 to an external network such as the Internet. This makes it possible for the image forming apparatus 1 and the terminal device 2A to communicate with a device outside of the intranet 4. For example, the apparatus and the device can communicate with a web server 5 connected to the Internet.

The web server 5 provides a website configured of a single or plural web pages to a device connected to the Internet. The web server 5 also provides, for each article in the website, data that is written in RSS format, i.e., RSS data, as shown in FIG. 4 and includes information such as a title (headline), a summary, publicized date/time, last updated date/time, and a URL of a web page that carries the contents (details) of an article.

There are slight differences in the formats of the RSS depending on the version thereof, and the unabbreviated name can also be "RDF Site Summary", "Rich Site Summary", or "Really Simple Syndication", depending on the version. Further, there is also a format called "Atom". The image forming apparatus 1, the terminal device 2A, and the web server 5 are compatible with any of the RSS versions.

FIG. 5 illustrates an example of a browsing setting table 6; FIG. 6 illustrates an example of a page image PE; FIGS. 7A and 7B illustrate an example of a page image PF; FIG. 8 illustrates an example of a web page image PG; and FIG. 9 illustrates an example of a document made up of a plurality of web pages. Next, the details of processing performed by each of the portions of the image forming apparatus 1 shown in FIG. 2 shall be described in detail.

In FIG. 2, the user box management portion 130 of the image forming apparatus 1 manages the box for each member of an organization where the intranet 4 is installed, i.e., for each user of the intranet 4. The "box" is a storage area corresponding to a "folder" or a "directory" of a personal computer.

The user box management portion 130 allocates a part of a storage area of the hard disk 10d to the box for each user and performs such a process as storing a new file into the box, updating the contents of an existing file, or deleting an existing file from the box.

In the present embodiment, the box is particularly used for storing files that are generated by the document data generation portion 105 which will be described later.

Note that each user is provided with a unique user code, and each box is associated with the user code of the user owning the box.

The browsing setting table storage portion 131 stores a browsing setting table 6 for each user in association with a user code of the user. As shown in FIG. 5, the browsing setting table 6 stores browsing setting data 6a for each website of the user's usual preference.

In the browsing setting data 6a, "browsing code" represents an identifier by which one piece of browsing data 6a is distinguished from the other pieces. "Site name" represents a name of the website. "URL" represents a URL (Uniform Resource Locator) indicating a location of RSS data on the Internet which is delivered by the website.

"Keyword" represents a keyword related to an article which the user wishes to browse among articles delivered from the website. "Category" represents a category (genre) under which the article falls.

Every time a new user is added, a browsing setting table 6 for that user is generated and stored in the browsing setting table storage portion 131. The browsing setting data 6a is generated by the browsing setting data generation portion 101 in a manner described below and stored in the browsing setting table 6.

When the user performs operation on the operation panel 10j, logs onto the image forming apparatus 1 by using the user's own user code, and inputs a predetermined command, the browsing setting data generation portion 101 causes a web browser screen to be displayed on the operation panel 10j. Then, through the operation performed in the web browser, the user accesses a website that distributes an article which the user wishes to browse, finds a URL of RSS data of the website, and specifies that URL to the image forming apparatus 1. The user further inputs the site name of the website, a keyword, and a category of an article which the user wishes to browse.

In response, the browsing setting data generation portion 101 issues a new browsing code and generates browsing setting data 6a indicating the site name, the URL, the keyword, and the category specified or inputted by the user, and makes the browsing setting data 6a to be stored in the browsing setting table 6 of the user.

It may be arranged such that the user can operate the terminal device 2A, in place of the operation panel 10j, to specify and input the items.

The user can register or store a plurality of pieces of browsing setting data 6a for a single website in the user's own browsing setting table 6. For example, when the user wishes to browse, among articles delivered from a website, an article relating to "foreign exchange" in a category of "finance" and an article relating to "new product release" in a category of "business", by performing the aforementioned operation, the user can simply register in advance, in the user's own browsing setting table 6, a piece of browsing setting data 6a indicating a category of "finance" and a keyword of "foreign exchange" and another piece of browsing setting data 6a indicating a category of "business" and a keyword of "new product release".

The RSS data, in general, indicates a title for each article delivered from a website and a URL of a web page carrying the contents of the article.

In addition, as described above, the image forming apparatus 1 has an unconventional function of outputting an article delivered from a website on the Internet or storing data of the article in a format according to a user's preference. To be more specific, the image forming apparatus 1 outputs the article or stores data thereof in a format described below.

As shown in FIG. 6, the image forming apparatus 1 prints, in a form like a banner advertisement on an obverse side of paper, a list of article titles etc. together with an image of a document (e.g., a report) which is a principal item to be printed. Hereinafter, the print format such as this is referred to as "margin-space list print". Further, the list of article titles etc. is referred to as "article title list GB"; an image of a document which is a principal item to be printed is referred to as "main image GA"; and an image constituted of the main image GA and the article title list GB, both of which are printed on the same page, is referred to as "page image PE".

Alternatively, as shown in FIGS. 7A and 7B, the image forming apparatus 1 prints the article title list GB on a reverse side of the paper having the main image GA printed on an obverse side thereof. Hereinafter, the print format such as this is referred to as "reverse-side list print".

Still alternatively, as shown in FIG. 8, the image forming apparatus 1 prints a web page carrying the contents of an article on paper. In this case, the web page can either be printed on an obverse side of additional paper following the last page carrying the main image GA or on a reverse side of the paper having the main image GA printed on an obverse side thereof. Hereinafter, the former print format is referred to as "obverse-side web page print", and the latter print format is referred to as "reverse-side web page print".

In addition, as shown in FIG. 9, the image forming apparatus 1 can arrange the web pages in order of downloaded date and prints the result as a set of documents in the obverse-side web page print or the reverse-side web page print.

Alternatively, the image forming apparatus 1 can print a web page carrying the contents of an article at a time in accordance with information delivered from a web site which is different from a website that distributes the article.

In addition to the functions described above, the image forming apparatus 1 can generate, store, or transfer to another device an image file, e.g., a file in such a format as PDF or TIFF, from which the aforementioned web page is printed or displayed on a display.

Figure 12:
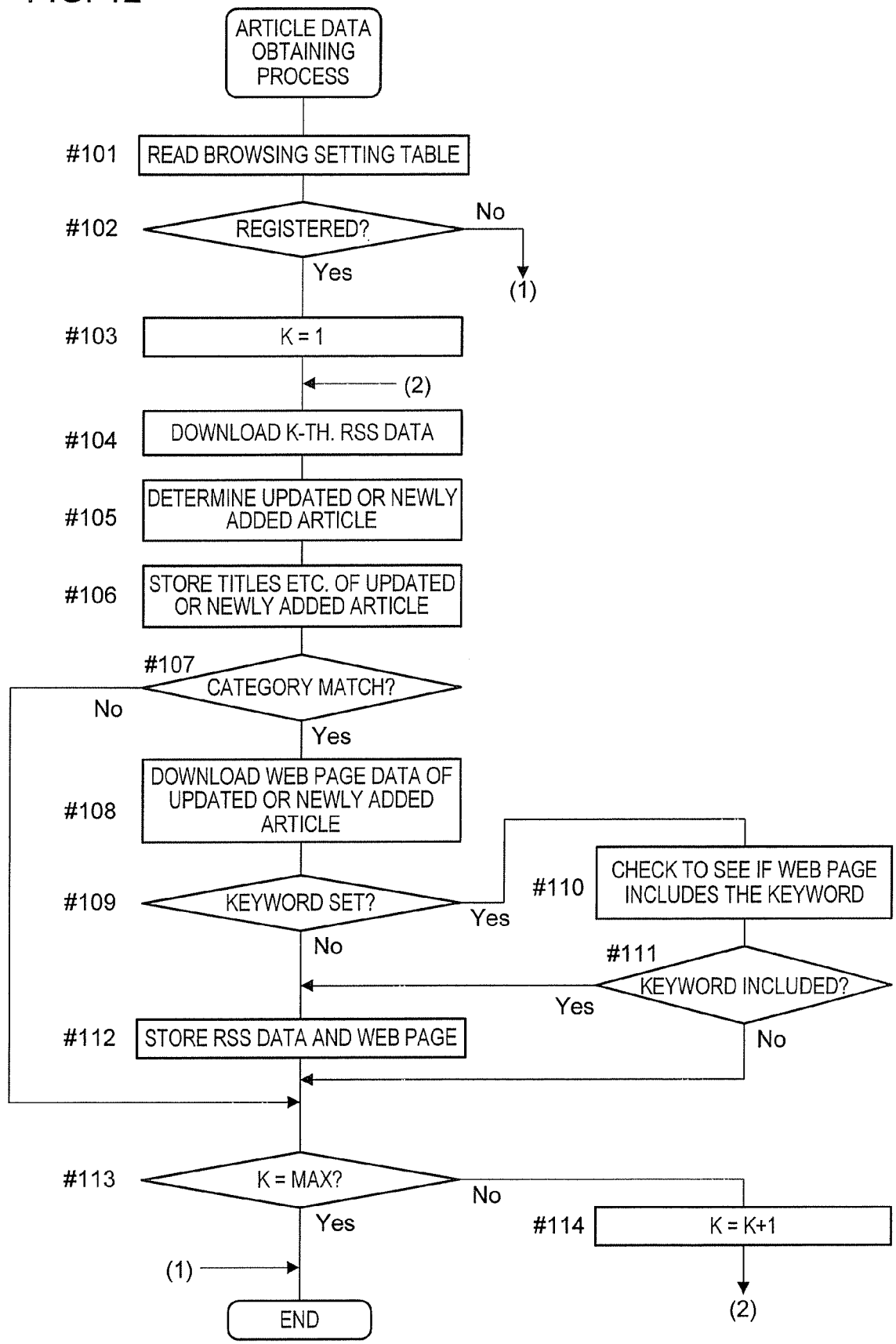
FIG. 12 is a flowchart for explaining an example of a flow of an article data obtaining process.

FIG. 10 illustrates an example of print setting data 7; FIG. 11 illustrates an example of a print setting screen HG1; and FIG. 12 is a flowchart for explaining an example of a flow of an article data obtaining process.

With reference to FIG. 2 again, the print setting data storage portion 132 stores the print setting data 7 for each user. As shown in FIG. 10, the print setting data 7 is constituted of list print condition data 71 and web page print condition data 72, and indicates details of setting etc. for printing an article which the user wishes to print.

The list print condition data 71 indicates the conditions for the above-mentioned margin-space list print and reverse-side list print. At the same time, the web page print condition data 72 indicates the conditions for the web page print such as the obverse-side web page print and the reverse-side web page print, and the conditions for storing and transferring the file of web page.

The print setting data 7 is generated by the print setting data generation portion 102. Hereinafter, a description will be given of a generation process of the print setting data 7 and the meaning of the individual conditions indicated in the print setting data 7.

When the user logs onto the image forming apparatus 1 by using the user's own user code and inputs a predetermined command, the print setting data generation portion 102 causes the operation panel 10j to display a print setting screen HG1 thereon as shown in FIG. 11. The user specifies details of setting for print etc. which the user desires on the print setting screen HG1 in a manner as described below.

When the user wishes to make the image forming apparatus 1 print the article title list GB, the user touches on a check box marked "Yes" in "List print" so as to turn it on. Further, if the user wishes to print the article title list GB classified in categories, the user turns on a check box marked "Yes" in "Category classification print". If the user does not wish to classify, the user turns on a check box marked "No". If the user further wishes to print the article title list GB in a format of the margin-space list print as shown in FIG. 6, the user turns on a check box marked "Obverse side margin space" in "Print side". If the user wishes to print it in a format of the reverse-side list print as shown in FIG. 7B, the user turns on a check box marked "Reverse side".

In contrast, if the user does not wish to print the article title list GB, the user turns on a check box marked "No".

Furthermore, the user specifies printing of a web page carrying contents of the article and handling of data thereof in the following manner.

If the user wishes to narrow down web pages so that only web pages of articles relating to a keyword specified in advance, which is indicated in the browsing setting data 6a (FIG. 5) of that user, the user turns on a check box marked "Yes" in "Keyword refined printing/storing/transferring". If the user does not wish to narrow down by a keyword, the user turns on a check box marked "No".

If the user wishes to narrow web pages down to those carrying articles in a specific category for printing or the like, the user turns on a check box marked "Yes" in "Category refined printing/storing/transferring". Additionally, the user specifies the category in a specifying area (an area in parentheses) located on the right side of a condition name, i.e., "Target category". If the user does not wish to narrow down, the user turns on a check box marked "No".

If the user wishes to print a web page in a format of the obverse-side web page print, the user turns on a check box marked "Obverse side" in "Print side". If the user wishes to print it in a format of the reverse-side web page print, then the user turns on a check box marked "Reverse side".

If the user wishes to store the image file of the web page in the box, the user turns on a check box marked "BOX" in "Storing BOX". Further, when the image file is to be stored in the box, the user specifies a file name given to the image file in a specifying area on the right side of a condition name, i.e., "File name".

If the user wishes to transfer an image file of a web page to another device, the user specifies in the following manner in accordance with the transfer method. If the file is transferred by a protocol such as FTP to the file server 2B, the user turns on a check box marked "Server" and specifies the address (e.g., IP address) of the file server 2B in a specifying area on the right side of a condition name, i.e., "Address". If the file is transferred to another device by E-mail, the user turns on a check box marked "Attach to E-mail" and specifies the E-mail address, which is assigned to the device, in an identical area as provided for the case of FTP.

If the user wishes to print a web page at a time in accordance with information delivered from another website which is different from a website that transmits the web page, the user turns on a check box marked "Yes" in "Trigger condition setting for printing/storing/transferring". In addition, the user specifies a URL of the aforementioned another website in a specifying area on the right side of a condition name, i.e., "Target RSS site". For example, if the user wishes to print the web page at a time in accordance with a weather forecast delivered by the aforementioned another website, the user specifies a URL of a web page for the weather forecast on the aforementioned another website. In addition, the user specifies, in a specifying area on the right side of a condition name, i.e., "Keyword", a specific item which the information is about and, in accordance with which, printing is performed. For example, if the user wishes to perform printing at a time when information of "rain" is delivered from the aforementioned another website, the user specifies "rain" as a keyword.

As shown in FIG. 9, if the user wishes to print web pages in order of downloaded dates, the user turns on a check box marked "Yes" in "File combining processing". Further, a time frame (from when to when) to which date and time of web page to be printed corresponds to is specified in a specifying area on the right side of a condition name, i.e., "Obtaining period". If the user wishes to print a later dated web page to have a smaller page number, the user turns on a check box marked "Add forward". If the user wishes to print a later dated web page to have a larger page number, the user turns on a check box marked "Add backward".

Upon completion of specifying all necessary items, the user presses an "OK" button. Then, the print setting data generation portion 102 generates print setting data 7 representing the specified details and stores it in the print setting data storage portion 132 in association with the user code of the user. Note that the process described above may be performed by displaying the print setting screen HG1 on the terminal device 2A so that the user can remotely specify the items.

With reference to FIG. 2 again, the download processing portion 103 downloads, from the web server 5, RSS data and data such as a HTML file and an image file which is required for reproducing a web page indicated in the RSS data, based on the browsing setting table 6 and the print setting data 7 for each user. Hereinafter, the RSS data and the data required for reproducing the web page that are downloaded by the download processing portion are referred to as "RSS data 80" and "web page data 81", respectively.

The RSS data 80 and the web page data 81 thus downloaded are associated with the user code of the user and stored in the RSS data storage portion 133. The web page data 81, once used for printing documents of the user, will be deleted from the RSS data storage portion 133. Alternatively, the web page data 81 is deleted when a predetermined period (e.g., 24 hours) has elapsed since it was stored in the RSS data storage portion 133.

The update presence/absence determination portion 104 determines whether or not the downloaded RSS data 80 indicates an updated or newly added article.

With reference to the flowchart in FIG. 12, a description will be given of a processing flow by the download processing portion 103 and the update presence/absence determination portion 104 by taking an example in which the RSS data 80 and the web page data 81 are downloaded for a specific user Ux.

The download processing portion 103 reads out the browsing setting table 6 (FIG. 5) and the print setting data 7 (FIG. 10) with which the user code of the user Ux is associated from the browsing setting table storage portion 131 and the print setting data storage portion 132 (#101 in FIG. 12). If even a single piece of browsing setting data 6a is not registered or stored in the browsing setting table 6 (No in #102), the download process ends. In addition, a condition of "List print" indicated in the list print condition data 71 of the print setting data 7 shows "No", the download process also ends.

If the browsing setting data 6a is registered, the download processing portion 103 makes the first piece of browsing setting data 6a (#103) as a target.

Then, the download processing portion 103 downloads, from the web server 5, the RSS data 80 based on a URL indicated in the target browsing setting data 6a (#104). For example, if a URL of "http://www.example1.xxx/index.rdf" is indicated in the browsing setting data 6a, the download processing portion 103 accesses a web server 5 belonging to a domain of "example.xxx" and including a server name of "www", and downloads an RSS file (RSS data 80) having a file name of "index.rdf". This piece of RSS data 80 is stored in the RSS data storage portion 133.

The update presence/absence determination portion 104 determines whether or not an article indicated by the downloaded RSS data 80 has been updated or newly added (#105).

For example, when the publicized date and time of an article indicated in the RSS data 80 is compared with the previous date and time on which download was performed based on the identical URL, and if the former is newer than the latter, the article indicated by the RSS data 80 can be determined as newly added. Alternatively, the date and time of the article indicated in the RSS data 80, although it is not newly added, is newer than the date and time on which download was performed previously based on the identical URL, then it can be determined that the article is updated.

If the RSS data 80 indicates a plurality of articles, the update presence/absence determination portion 104 determines on each of the articles whether or not it has been updated or newly added.

An updated or newly added article will be an article to be printed in a format of the margin-space list print as shown in FIG. 6 or the reverse-side list print as shown in FIG. 7. For this reason, the update presence/absence determination portion 104 temporarily stores a title, a description, a URL of a web page that carries the contents, a category indicated in the browsing setting data 6a, and updated article data 82 indicating a user code of the user Ux of each article that is determined to have been updated or newly added (#106). Note that the title, the description, and the URL are indicated in the RSS data 80.

The download processing portion 103 downloads, from the web server 5, web page data 81 of a web page carrying the article that has been determined, by the update presence/absence determination portion 104, to have been updated or newly added based on the URL of the article which is indicated in the RSS data 80 (#108).

However, if a condition of "Category refined printing/storing/transferring" indicated in the web page print condition data 72 shows "Yes", the web page data 81 is downloaded (#108) only in the case there is a match between a category indicated in the browsing setting data 6a and any of categories specified as "target category" (Yes in #107). The web page data 81 is not downloaded if there is no match.

Such a web page will be an item to be printed in a format of the obverse-side web page print or the reverse-side web page print as shown in FIG. 8. However, if the user Ux has specified a keyword for refinement, only such a web page that relates to the keyword will be an item to be printed in the aforementioned form.

For this reason, if a condition of "Keyword refined printing/storing/transferring" indicated in the web page print condition data 72 of the print setting data 7 shows "Yes" and, at the same time, some keyword is specified in the browsing setting data 6a (Yes in #109), the download processing portion 103 checks whether or not a keyword indicated in the browsing setting data 6a is included in the content portion of each downloaded web page (#110). However, if a plurality of keywords are connected to one another by an "and" operator, it is checked whether or not all of the keywords are included. If a plurality of keywords are connected by an "or" operator, it is checked whether or not at least one keyword is included.

Then, the download processing portion 103 stores the web page data 81 of the web page that includes the keyword(s) as indicated in the browsing setting data 6a in the RSS data storage portion 133 in association with the user code of the user Ux and the date and time of download (Yes in #111, and #112).

On the other hand, if a condition of "Keyword refined printing/storing/transferring" indicated in the web page print condition data 72 of the print setting data 7 shows "No" (No in #109), the download processing portion 103 bypasses the processes in steps #110 and #111 and stores the web page data 81 thus downloaded in the RSS data storage portion 133 in association with the user code of the user Ux and the date and time of download (#112).

The download processing portion 103 and the update presence/absence determination portion 104 perform the processes in steps #104-#112 appropriately in a similar manner based on the second browsing setting data 6a and onward indicated in the browsing setting table 6 of the user Ux.

Through the processing described above, the updated article data 82 of an article which the user Ux wishes to browse can be aggregated.

With reference to FIG. 2 again, the document data generation portion 105 performs processing for generating data of an image for printing or displaying a document in various forms each of which is illustrated in FIGS. 6, 7, 8, and 9, respectively.

The printing control portion 106 controls the printing unit 10g such that a document is printed on paper based on the data generated by the document data generation portion 105.

The E-mail transmission portion 107 performs processing for attaching the data of the document generated by the document data generation portion 105 to E-mail and transmitting the result to another device. The file transfer portion 108 performs processing for transmitting the data to the file server 2B using such a protocol as FTP.

The processing details of the document data generation portion 105 through the file transfer portion 108 vary depending on the settings indicated in the browsing setting table 6 and the print setting data 7. Hereinafter, the details of processing performed by the document data generation portion 105 through the file transfer portion 108 will be described by taking an example in which a document is provided to a specific user Ux.

Figure 13:
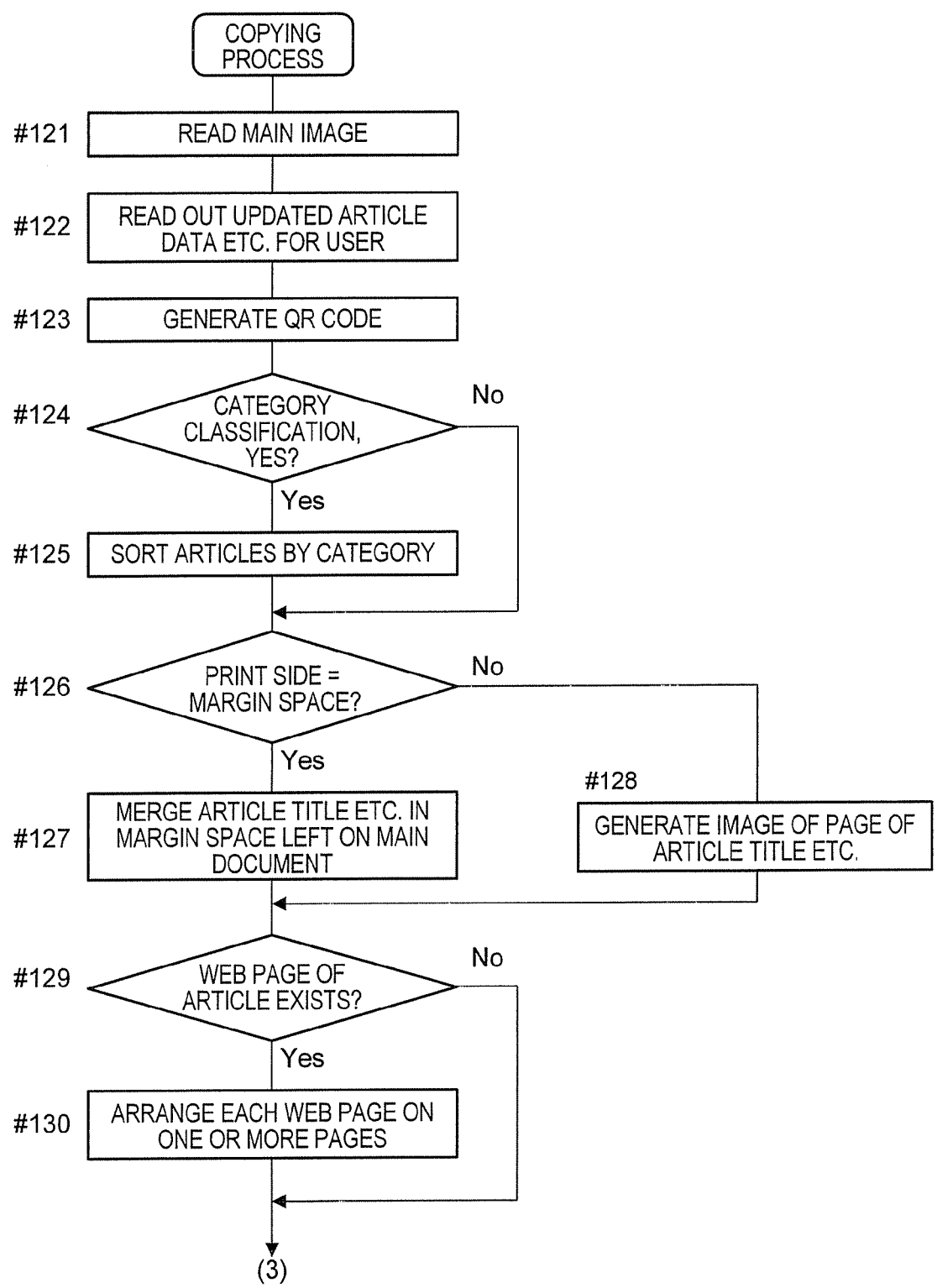
FIG. 13 is a flowchart for explaining an example of a copying process.
Figure 14:
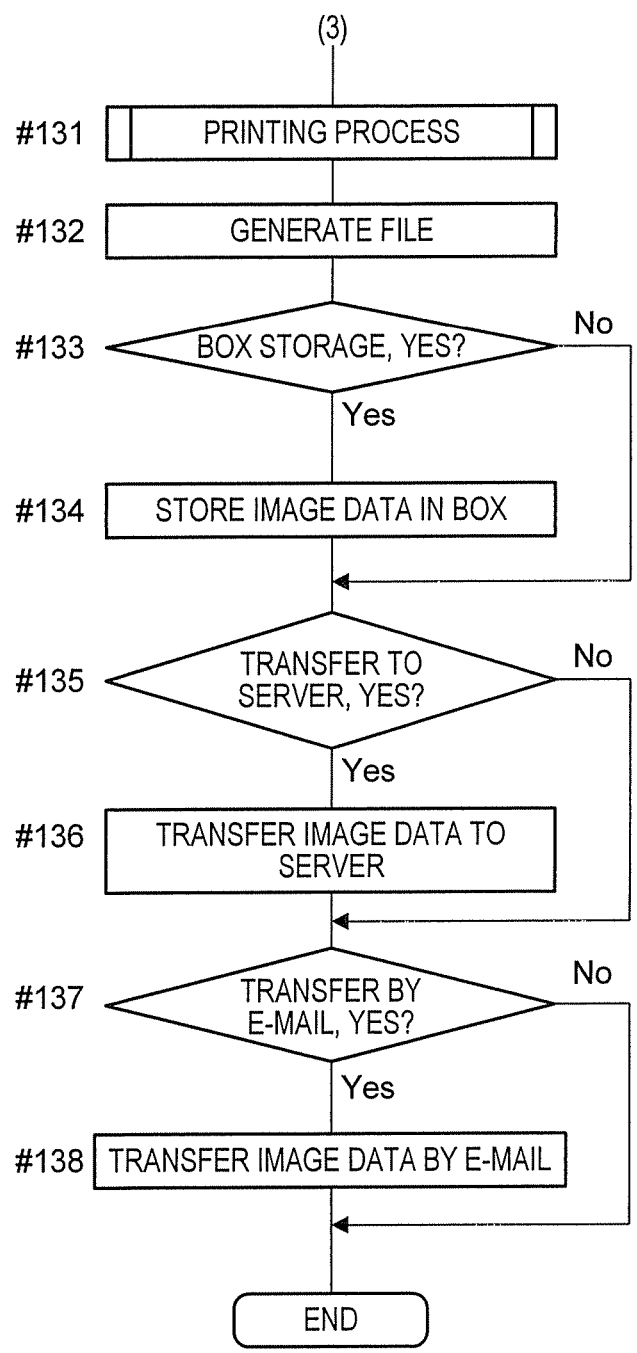
FIG. 14 is a flowchart for explaining an example of a copying process.
Figure 15:
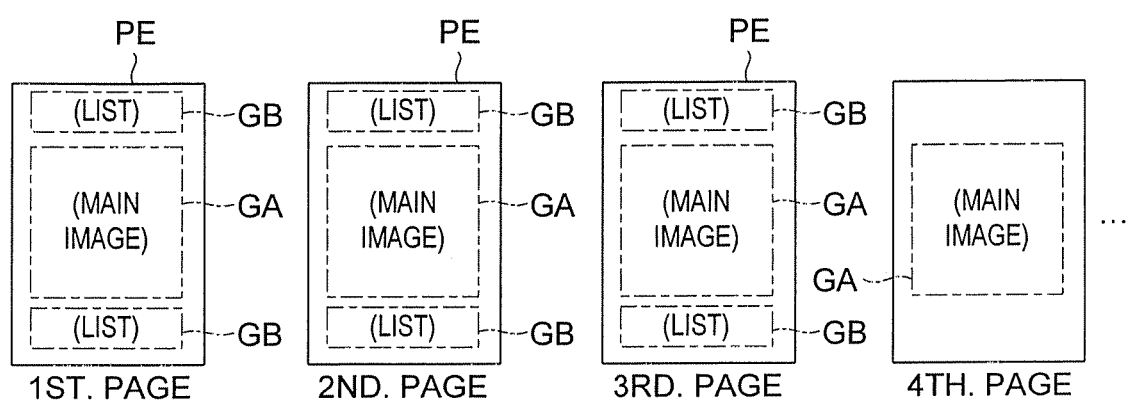
FIG. 15 illustrates an example of a layout of a list of articles.
Figure 16:
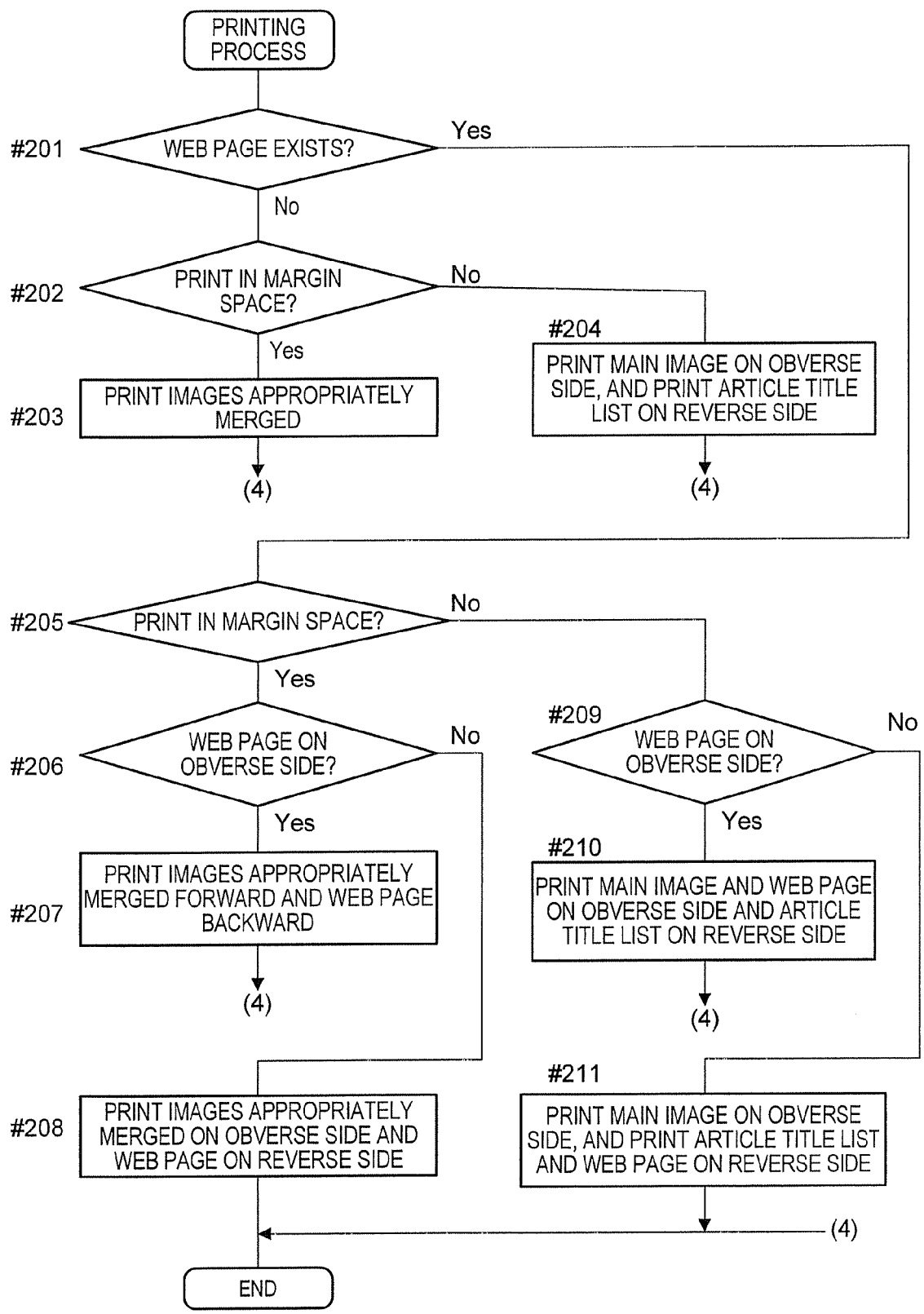
FIG. 16 is a flowchart for explaining an example of a flow of a printing process.

[First providing method] FIGS. 13 and 14 are flowcharts for explaining an example of a copying process; FIG. 15 illustrates an example of a layout of a list of articles; FIG. 16 is a flowchart for explaining an example of a flow of a printing process; and FIGS. 17A--22 illustrate examples of printing formats.

For example, it is assumed that a user Ux who has turned on "Yes" as a condition of "List print" logs onto the image forming apparatus 1 by using the user's own user code, places a document of a plurality of pages on a document table of the image forming apparatus 1 to make a set of copy thereof, and enters a predetermined command into the image forming apparatus 1.

Then, in the image forming apparatus 1, the processing is performed in the steps shown in FIGS. 13 and 14. The document data generation portion 105 makes the scanner unit 10f read each page of the document, and thereby image data of a main image GA of each page is obtained (#121 in FIG. 13).

The document data generation portion 105 reads out all of updated article data 82 for the user Ux (#122) and generates a QR (Quick Response) code that indicates a URL for each article indicated in the updated article data 82 (#123).

If a condition of "Category classification print" indicated in the list print condition data 71 of the print setting data 7 of the user Ux shows "Yes" (Yes in #124), individual articles indicated in individual pieces of the updated article data 82 are classified in categories and sorted out accordingly (#125).

If a condition of "Print side" indicated in the list print condition data 71 of the print setting data 7 shows "Obverse side margin space" (Yes in #126), the document data generation portion 105 generates a page image PE by merging the main image GA and the article title list GB together so that the article title list GB, which includes the title, the URL, the description, and the QR code generated in step #123 of each of the articles that are indicated in the updated article data 82 and sorted out as necessary, can be printed in a margin space left when the main image GA is printed on paper as shown in FIG. 6 (#127). If the main image GA and all of the article title lists GB of all of the articles can not be merged onto a single page, then the articles are divided into some groups and merged onto individual pages as shown in FIG. 15.

On the other hand, if a condition of "Print side" indicates "Reverse side" (No in #126), the document data generation portion 105 generates an image (hereinafter, referred to as "page image PF") in which the article title lists GB alone occupies an entire page as shown in FIG. 7B (#128).

If web page data 81 that is associated with the user code of the user Ux is stored in the RSS data storage portion 133 (Yes in #129), the document data generation portion 105 arranges a plurality of web pages together into a single page in accordance with a size of each of the web pages as shown in FIG. 8, arranges a single web page into a single page, or divides a single web page to be arranged in a plurality of pages, to thereby generate a page image (hereinafter, referred to as "web page image PG") representing one or a plurality of web pages (#130).

The printing control portion 106 performs processing of printing an image obtained in steps #121, #127, #128, or #130 on paper (#131 in FIG. 14). The steps of the processing are shown in FIG. 16.

Figure 17A:
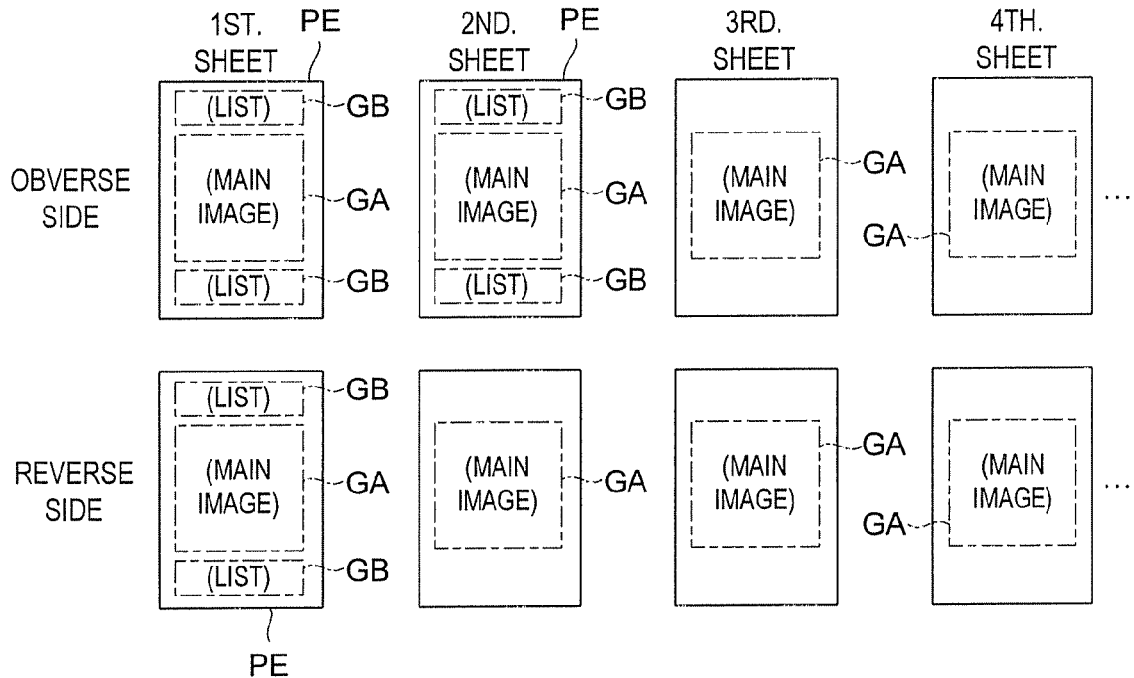
FIGS. 17A and 17B illustrate examples of printing formats.
Figure 17B:
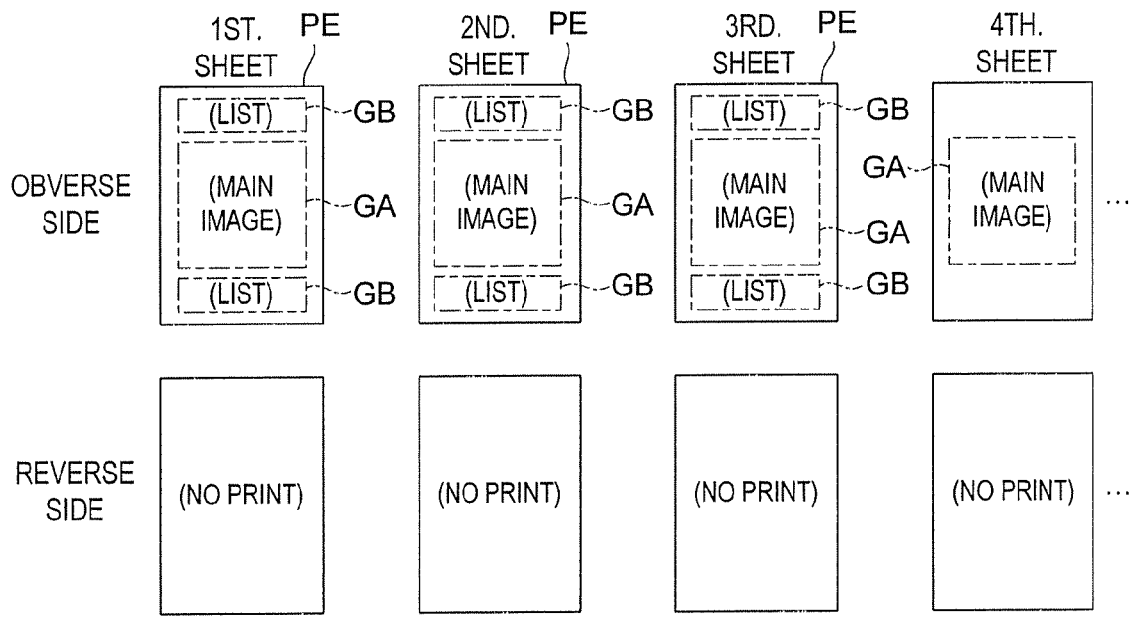
Figure 18:
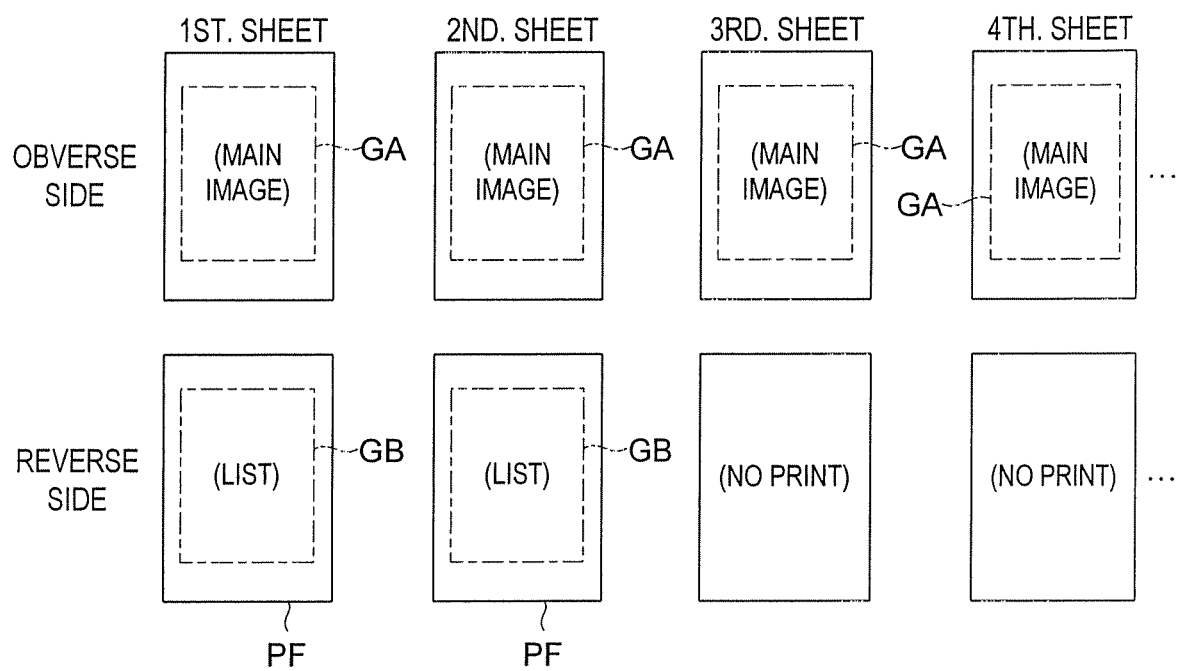
FIG. 18 illustrates an example of a printing format.

In the case where the web page data 81 associated with the user code of the user Ux is not stored in the RSS data storage portion 133 (No in #201 in FIG. 16) and if a condition of "Print side" indicated in the list print condition data 71 shows "Obverse side margin space" (Yes in #202), the printing control portion 106 controls the printing unit 10g so that a page image PE made up of the main image GA and the article title list GB generated in step #127 is printed on one side of each sheet of paper, or individual main images GA are printed on a single side of individual sheets of paper if some of the main images GA are left unmerged with the article title lists GB (#203). As a result, such print as shown in FIG. 17A can be obtained in a duplex printing mode, and such print as shown in FIG. 17B can be obtained in a single-sided printing mode.

On the other hand, if a condition of "Print side" indicates "Reverse side" (No in #202), the printing control portion 106 controls the printing unit 10g in such a manner that the main images GA are printed individually on obverse sides of paper, and the page images PF generated in step #128 are printed individually on reverse sides of paper (#204).

Alternatively, if the web page data 81 is stored (Yes in #201), the printing control portion 106 controls the printing unit 10g in such a manner as described below in accordance with four combination sets of conditions.

Figure 19:
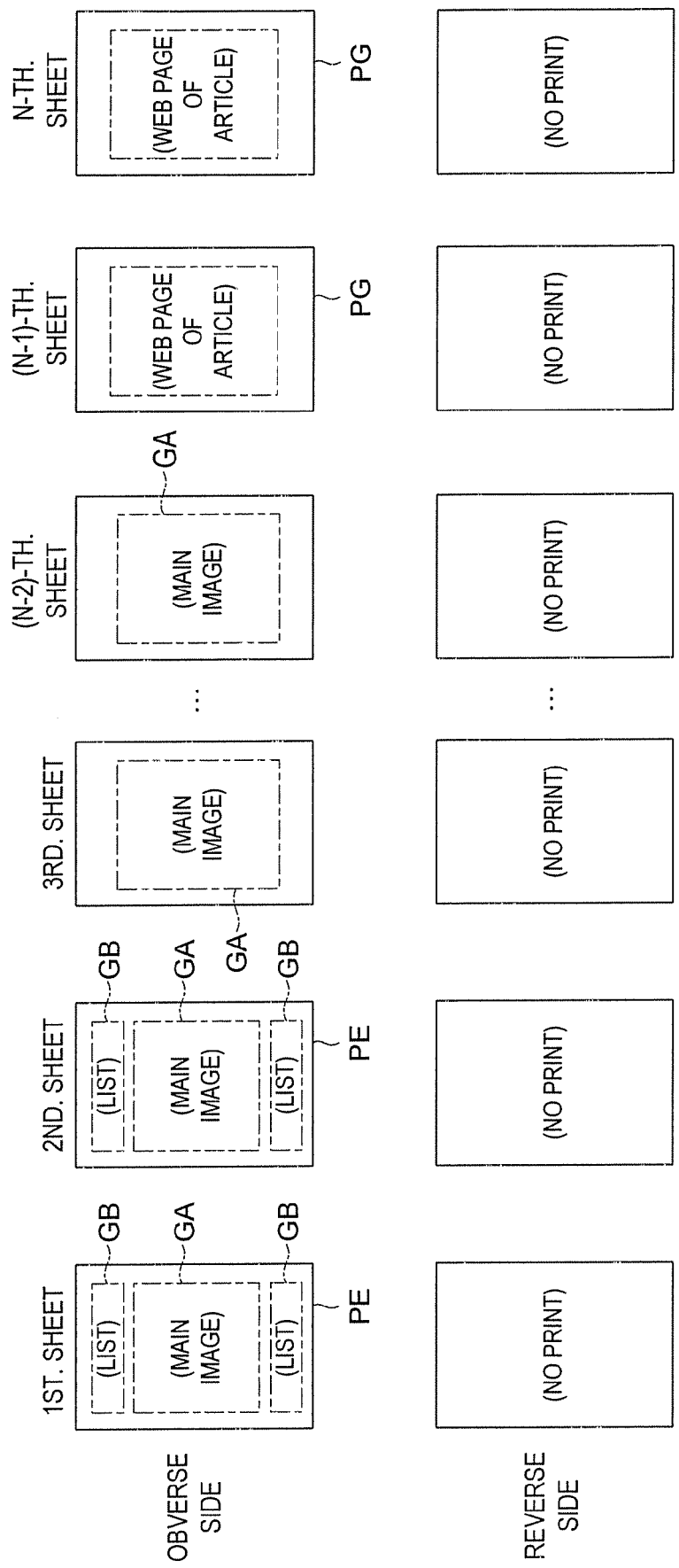
FIG. 19 illustrates an example of a printing format.

If a condition of "Print side" indicated in the list print condition data 71 shows "Obverse side margin space" (Yes in #205) and, at the same time, a condition of "Print side" indicated in the web page print condition data 72 shows "Obverse side" (Yes in #206), as shown in FIG. 19, the printing control portion 106 controls the printing unit 10g in such a manner that each page image PE made up of the main image GA and the article title list GB generated in step #127 is printed on an obverse side of paper, each main image GA left unmerged with the article title list GB is printed on an obverse side of paper, and thereafter each web page image PG generated in step #130 is printed on an obverse side of paper (#207).

Figure 20:
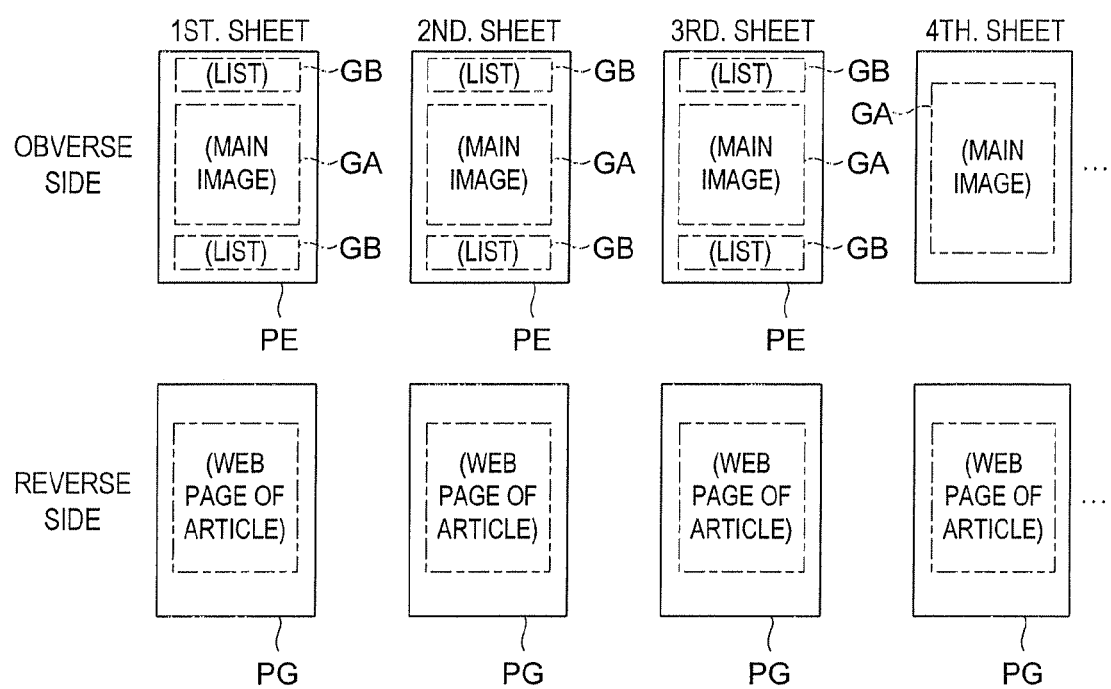
FIG. 20 illustrates an example of a printing format.

If a condition of "Print side" indicated in the list print condition data 71 shows "Obverse side margin space" (Yes in #205) and, at the same time, a condition of "Print side" indicated in the web page print condition data 72 shows "Reverse side" (No in #206), as shown in FIG. 20, the printing control portion 106 controls the printing unit 10g in such a manner that each page image PE made up of the main image GA and the article title list GB generated in step #127 is printed on an obverse side of paper, then each main image GA left unmerged with the article title list GB is printed on an obverse side of paper, and further each web page image PG generated in step #130 is printed on a reverse side of the aforementioned paper (#208).

Figure 21:
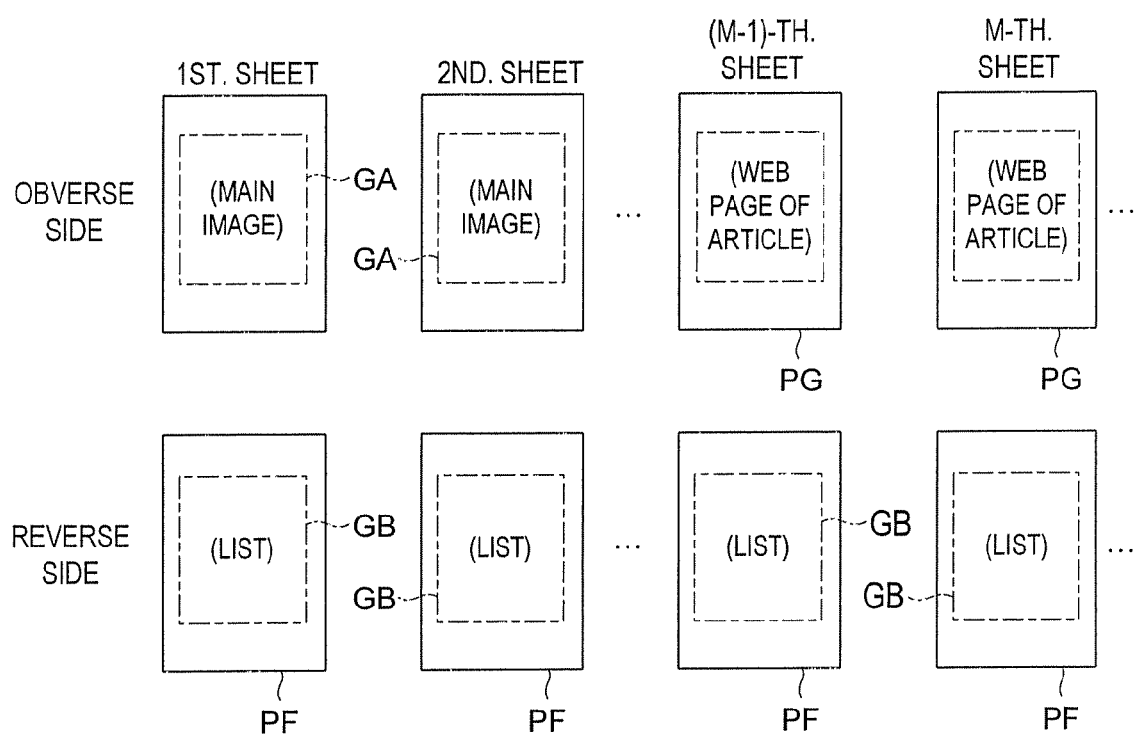
FIG. 21 illustrates an example of a printing format.

If a condition of "Print side" indicated in the list print condition data 71 shows "Reverse side" (No in #205) and, at the same time, a condition of "Print side" indicated in the web page print condition data 72 shows "Obverse side" (Yes in #209), as shown in FIG. 21, the printing control portion 106 controls the printing unit 10g in such a manner that each main image GA generated in step #127 is printed on an obverse side of paper, then each web image PG generated in step #130 is printed on an obverse side of paper, and further each page image PF generated in step #128 is printed on a reverse side of the aforementioned paper (#210).

Figure 22:
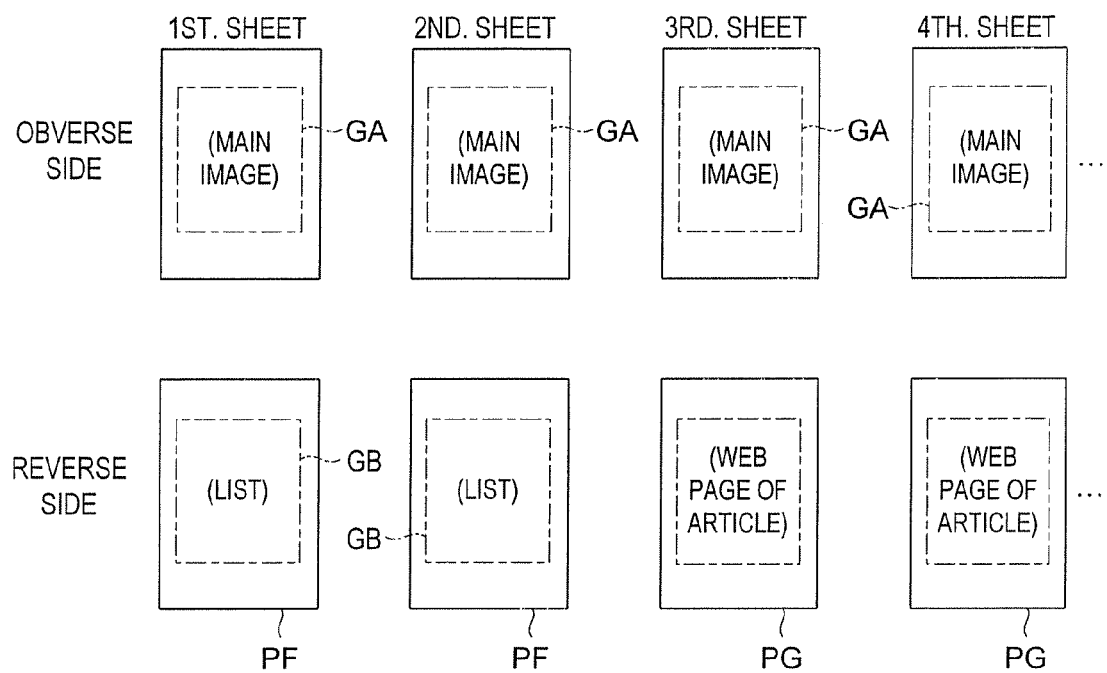
FIG. 22 illustrates an example of a printing format.

If a condition of "Print side" indicated in the list print condition data 71 shows "Reverse side" (No in #205) and, at the same time, a condition of "Print side" indicated in the web page print condition data 72 shows "Reverse side" (No in #209), as shown in FIG. 22, the printing control portion 106 controls the printing unit 10g in such a manner that each main image GA generated in step #127 is printed on an obverse side of paper, then each web image PF generated in step #128 is printed on a reverse side of the aforementioned paper, and further each web page image PG generated in step #130 is printed on a reverse side of the aforementioned paper (#211).

With reference to FIG. 14 again, the document data generation portion 105 generates an image file FL in such a format as PDF or TIFF for displaying or printing the web page downloaded for the user Ux (#132). During the process, the image file FL is given a file name specified in "File name" indicated in the web page print condition data 72.

If a condition of "BOX storage" indicated in the web page print condition data 72 shows "Yes" (Yes in #133), the user box management portion 130 stores the generated image file FL in the box of the user Ux (#134).

If "Server" is shown as a condition of "Transfer destination" indicated in the web page print condition data 72 (Yes in #135), the file transfer portion 108 transfers the generated file FL to a file server 2B having an IP address specified in "Address" indicated in the web page print condition data 72 (#136).

If "E-mail" is shown as a condition of "Transfer destination" indicated in the web page print condition data 72 (Yes in #137), the E-mail transmission portion 107 transmits (transfers) E-mail, to which the generated image file FL is attached, to an E-mail address indicated in "Address" of the web page print condition data 72 (#138).

Instead of the image file FL, it is also possible to store or transfer the document used for printing in step #131 as a file to be displayed on a display or to be reprinted.

Figure 25:
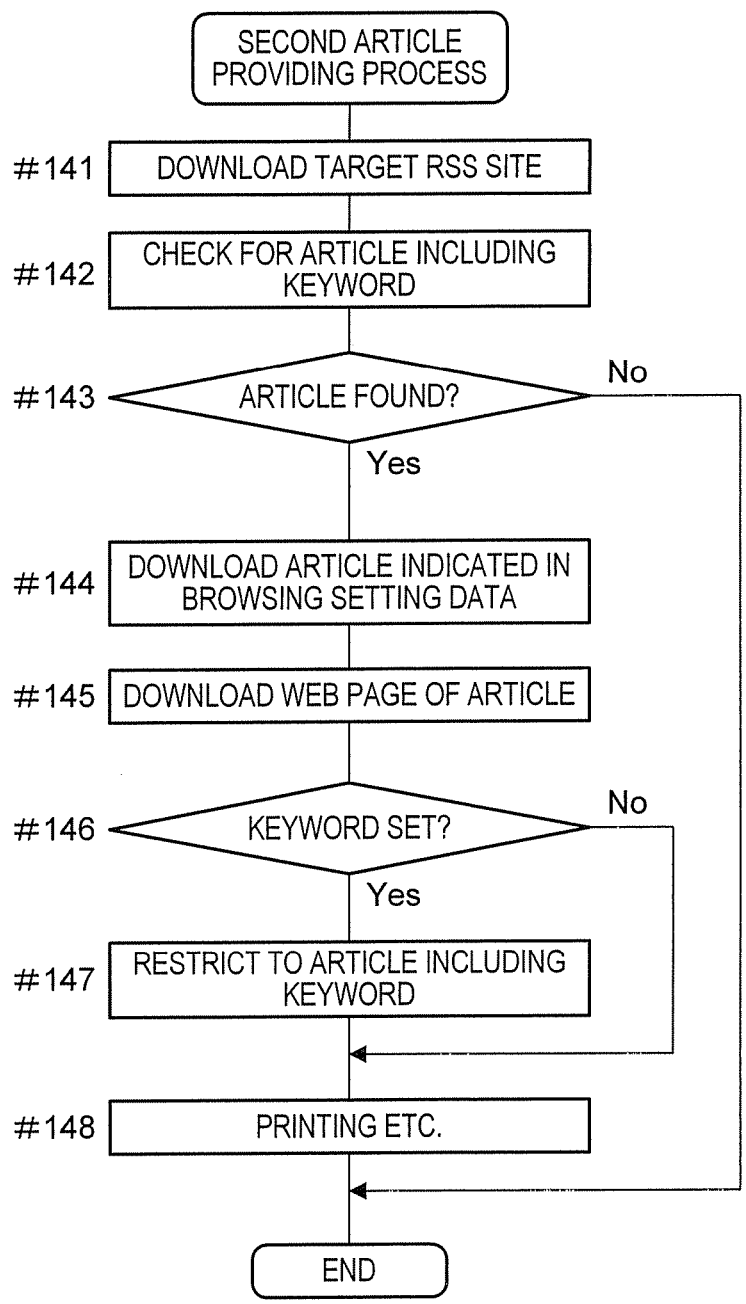
FIG. 25 is a flowchart for explaining an example of a printing process.

[Second providing method] FIG. 23 illustrates an example of a browsing setting table 6; FIG. 24 illustrates an example of web page print condition data 72; FIG. 25 is a flowchart for explaining an example of a printing process.

The user is able to obtain a printed matter of a web page of a specific website at a time in accordance with information delivered from another website.

Hereinafter, a description will be given of details of processing of various portions of the image forming apparatus 1 by taking an example in which a specific user Uy wishes to obtain a printed matter of a web page of an article relating to a movie now on show at a theater in and around Umeda district in Osaka at a time when the weather forecast shows "rain" on Saturdays or Sundays in Osaka area.

As shown in FIG. 23, the user Uy registers, in advance, browsing setting data 6a indicating a URL of RSS data 80 of a website that distributes an article relating to a movie, "Umeda" as a keyword, and "hobby" as a category in the user's own browsing setting table 6.

As shown in FIG. 24, the user further registers, in advance, print setting data 7 including the web page print condition data 72 in which "Yes" is set as a condition of "Trigger condition setting for printing/storing/transferring", a URL of a website that distributes the weather forecast of Osaka area is set as "Target RSS site", and "(Saturday or Sunday) and rain" is set as "Keyword".

The operation and steps of processing for registering the browsing setting data 6a and the print setting data 7 are the same as those described earlier.

Then, various portions of the image forming apparatus 1 perform processing for providing the printed matter in the steps shown in FIG. 25. Hereinafter, a description will be given of such steps by taking an example of providing a printed matter relating to the aforementioned movie to the user Uy.

The download processing portion 103 searches for web page print condition data 72 that indicates "Yes" as a condition of "Trigger condition setting for printing/storing/transferring", and downloads RSS data 80 from a web server 5 of a weather forecast web site based on the URL indicated in "Target RSS site" in the web page print condition data 72 thus searched (#141 in FIG. 25).

The update presence/absence determination portion 104 checks whether or not any of the articles has been updated such that the keywords indicated in the web page print condition data 72 are contained in any of the articles (#142). In other words, the update presence/absence determination portion 104 checks whether there is any article that has been updated to include "rain" and any of "Saturday" and "Sunday". Whether or not these keywords are included can be found by checking the web page that carries the contents of the article or alternatively can be found by checking the description of the article indicated in the RSS data 80.

If there is any such an article (Yes in #143), the RSS data 80 is downloaded, based on the URL indicated in the browsing setting data 6a of the user Uy, from a web server 5 of a website that delivers the article about the movie (#144). Furthermore, web page data 81 of a web page carrying the contents of individual articles indicated in the RSS data 80 is downloaded (#145).

If the keywords are not indicated in the browsing setting data 6a (No in #146), the printing control portion 106 prints web pages of individual articles based on the downloaded web page data 81. If the keywords are indicated (Yes in #146), the printing control portion 106 prints only those web pages that include the keywords (#147, #148). Instead of printing the web page, the file transfer portion 108 may transfer data for displaying or printing the web page to a specific file server 2B, or the E-mail transmission portion 107 may transfer the data to a specific E-mail address.

Figure 28:
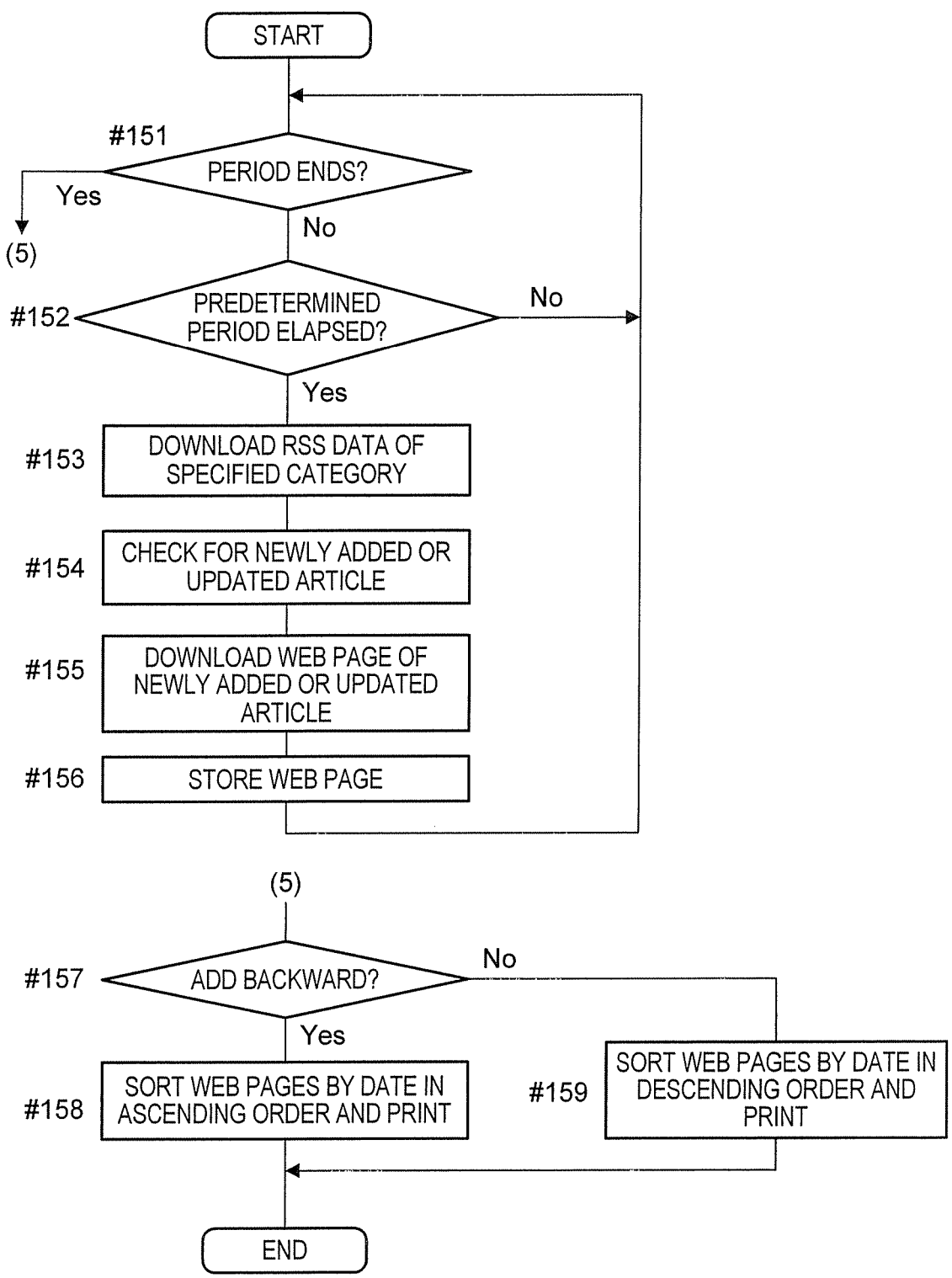
FIG. 28 is a flowchart for explaining an example of a flow for generating the document exemplified in FIG. 9.

[Third providing method] FIG. 26 illustrates an example of the browsing setting table 6; FIG. 27 illustrates an example of the web page print condition data 72; and FIG. 28 is a flowchart for explaining an example of a flow for generating the document exemplified in FIG. 9.

The image forming apparatus 1 is capable of sorting out the web pages of the articles that includes a specific keyword and belongs to a specific category in order of downloaded date and capable of printing the result as a set of documents. Hereinafter, a description will be given of an example, as shown in FIG. 9, in which a user Uz wishes to have a web page of an article relating to marketing of new cosmetics products in September 2007.

For each website that distributes the article described above, the user Uz registers, in advance, browsing setting data 6a in the browsing setting table 6 of the user Uz which indicates a URL of the website, a keyword of "new product and cosmetics", and a category of "marketing".

As shown in FIG. 27, the user Uz also registers, in advance, print setting data 7 that includes web page print setting data 72 showing "Yes" as "File combining processing", "Marketing" as "Target category", and a period of Sep. 1 to 30 in 2007 as "Obtaining period".

The operation and the steps of processing for registering the browsing setting data 6a and the print setting data 7 are the same as those described earlier.

Then, individual portions of the image forming apparatus perform processing according to the steps shown in FIG. 28 for providing a printed matter.

The download processing portion 103 downloads RSS data 80 each time a predetermined period elapses (No in #151, Yes in #152), for example, 24 hours, during a period specified in "obtaining period" (Sep. 1-30, 2007 in this example) on the basis of the browsing setting data 6a of the category indicated as "Target category" (e.g., "marketing" in this example) in the web page print condition data 72 (#153).

The update presence/absence determination portion 104 determines whether or not an article indicated in the RSS data 80 thus downloaded has been updated or newly added (#154).

The download processing portion 103 downloads web page data 81 of the web page carrying the contents of the updated article or the newly added article from a web server 5 based on a URL of the article indicated in the RSS data 80 (#155), and stores it in a predetermined area for storing temporary files (#156).

However, if the browsing setting data 6a indicates a keyword, only the web page data 81 of the web page including the keyword is stored. In this example, the web page data 81 of the web page including both keywords of "new product" and "cosmetics" is stored.

When the time lapses into October 2007 (Yes in #151), the printing control portion controls the printing unit such that each of the web pages is printed on paper one after another based on each piece of web page data 81 stored during the aforementioned period. To be more specific, if "Add backward" is indicated as "Adding method" in the web page print condition data 72 (Yes in #157), the downloaded web pages are printed so that the earlier dated web page has a smaller page number (#158). If "Add forward" is indicated (No in #157), the downloaded web pages are printed so that the newer dated web page has a smaller page number (#159). Data of the images of these pages for printing may be bundled together in a single file and stored in a box of the user Uz or transferred to a predetermined file server 2B or E-mail address.

Figure 29:
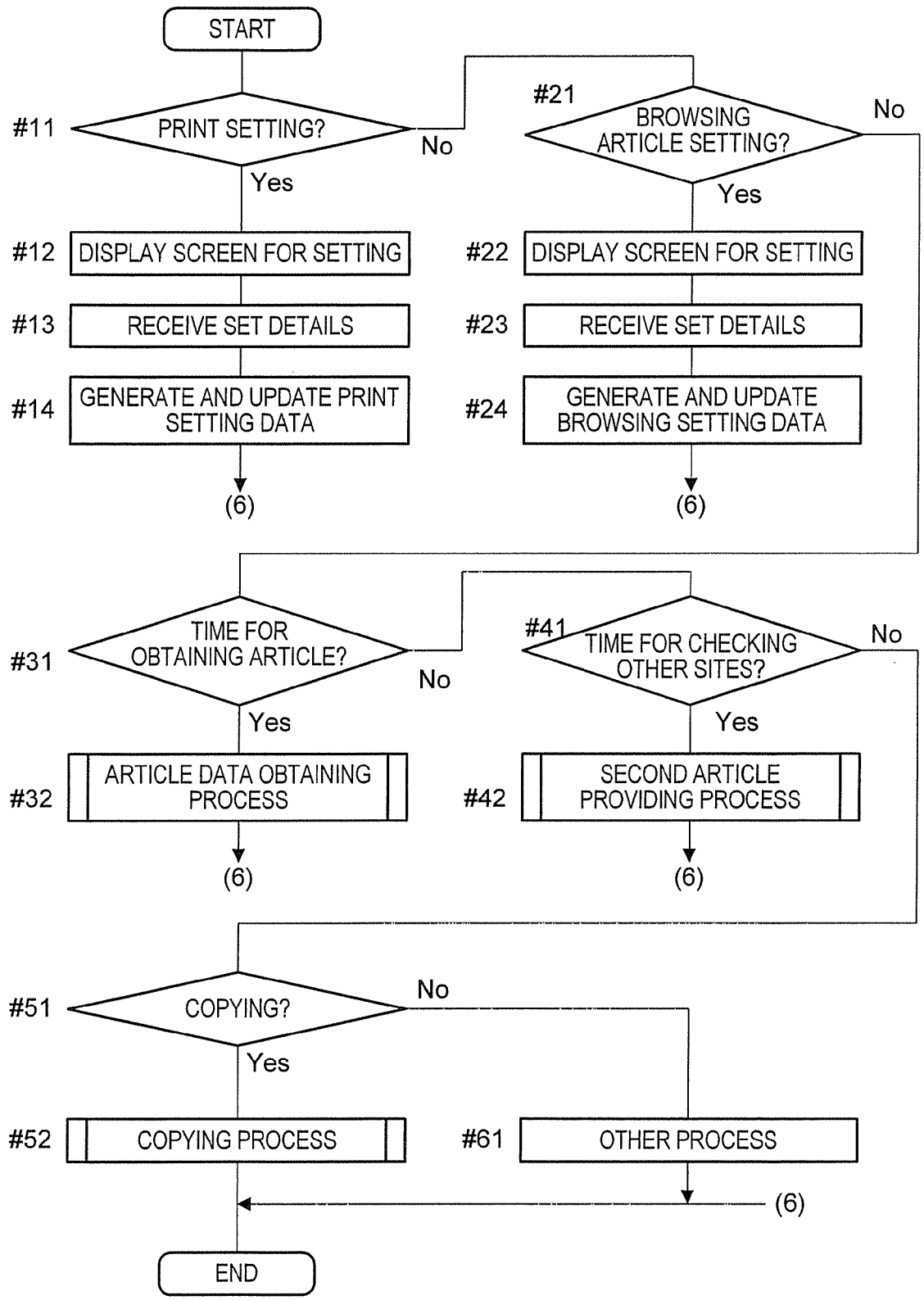
FIG. 29 is a flowchart for explaining an example of an overall processing flow of the image forming apparatus.

FIG. 29 is a flowchart for explaining an example of an overall processing flow of the image forming apparatus 1. Next, a description will be given of a flow of a process relating to printing by the image forming apparatus 1 with reference to the flowchart in FIG. 29.

The image forming apparatus 1 executes the following processes each time a command is entered by a user or at predetermined times.

When the user enters a command for setting printing (Yes in #11 in FIG. 29), the image forming apparatus 1 displays a print setting screen HG1 as shown in FIG. 11 (#12) and receives details of the setting for printing articles and so on (#13). Then, the image forming apparatus 1 newly generates or updates the print setting data 7 for that user (#14).

Alternatively, when the user enters a command for setting browsing of the article (Yes in #21), the image forming apparatus 1 displays a screen of a web browser (#22). Here, the user finds an article to the user's preference, specifies a keyword and a category as necessary, in addition to a URL of a website that delivers the article. Then, the image forming apparatus 1 generates browsing setting data 6a indicating the items specified by the user and registers the data in the browsing setting table 6 of that user (#23, #24).

Still alternatively, when the time for aggregating the articles comes, for example, at a predetermined time every day (Yes in #31), the image forming apparatus 1 performs processing for obtaining a list of articles and data of a web page of a newly added or updated article (#32). The processing steps are the same as those described earlier with reference to FIG. 12.

Still alternatively, when the time (for example, at a predetermined time every day) for checking a specific piece of information (for example, weather forecast in a specific area) comes (Yes in #41), the image forming apparatus 1 checks the specific piece of information, and prints a predetermined web page (#42) if a predetermined keyword is included in the information. The processing steps are the same as those described earlier with reference to FIG. 25.

Still alternatively, when the user enters a command for copying a document (Yes in #51), the image forming apparatus 1 prints, on paper, an image of the document together with a list of articles and a web page of an updated or newly added article that were downloaded in step #32 for that user (#52). The steps of the processing are the same as those described earlier with reference to FIGS. 13 and 14.

In addition, the image forming apparatus 1 performs various types of processing in accordance with a command etc. entered by a user (#61), and further performs the process of bundling the web pages of articles within a predetermined period of time together into a single document and printing the result.

According to the present embodiment, a user can obtain various articles publicized by various websites more efficiently than is conventionally possible. In addition, the user can print the collected articles in a format according to the user's preference. For example, the user can print the articles on the reverse side of printed matters such as a report, print even the details (contents or body text) of those articles that have been updated or newly added, print only titles and so on for other articles, and print the articles about a specific subject accumulated in a period of a month together as a bundle. Further, the user can obtain the latest article in accordance with a condition such as weather.

In the present embodiment, how the printed matter shown in FIG. 6, or FIGS. 7A and 7B is provided was described by taking an example of copying an image depicted on a sheet of document. However, it is also possible to adopt the present invention when facsimile is received and printed, and also when PC printing is performed.

FIG. 30 illustrates an example of a driver screen HG. When PC printing is performed based on an image file FL, the image (main image GA) to be printed through a PC may be printed together with the article title list GB. In this case, a driver screen HG2 such as the one shown in FIG. 30 is displayed on a terminal device 2A which a user uses. On this screen, the user specifies such items as the file name and stored location of the image file FL, a side of paper (obverse or reverse side) on which the main image GA is printed, whether or not an article title list GB is printed together, a location where the article title list GB is printed, i.e., on a side opposite to a side on which the main image GA is printed or in a margin space on a side where the main image GA is printed, and so on.

In accordance with the details specified by the user, the image forming apparatus 1 converts, by using the image file FL, the main image GA into a bitmapped format, and prints the main image GA and the article title list GB on an identical sheet of paper.

Finally, the configuration and functions of all or part of the image forming apparatus 1 and the intranet 4, the details or order of the processing performed thereby, the details of the various pieces of data, and so on can be modified in various ways within the spirit of the present invention. For example, the image forming apparatus 1, without limiting to an MFP, may be a digital copier, a printer, or the like.

What is claimed is:

1. An image forming apparatus comprising:
    a keyword storage portion that stores a keyword specified by a user;
    a retrieving portion that retrieves, from information publicized through a server, publicized information that includes updated or newly added contents and that also includes the keyword stored in the keyword storage portion;
    a print setting storage portion that stores at least one print setting specified by the user prior to the retrieval of the publicized information by the retrieving portion, the at least one print setting indicating a manner in which the publicized information is to be printed; and
    a printing portion that prints the publicized information thus retrieved by the retrieving portion according to the at least one print setting stored in the print setting storage portion.

2. The image forming apparatus according to claim 1, wherein the printing portion prints a title list indicating a title of each piece of the publicized information on an identical sheet of paper on which the publicized information is printed.

3. The image forming apparatus according to claim 2, wherein the printing portion prints the publicized information and the title list on different sides of the identical sheet of paper, respectively.

4. The image forming apparatus according to claim 1, further comprising a document image reading portion that optically reads a document image from a paper document, wherein the printing portion prints the document image read by the document image reading portion on an identical sheet of paper on which the publicized information is printed.

5. The image forming apparatus according to claim 4, wherein the printing portion prints the publicized information and the document image on different sides of the identical sheet of paper, respectively.

6. The image forming apparatus according to claim 4, wherein the printing portion prints a title list indicating a title of each piece of the publicized information in a margin space left when the document image is printed on the identical sheet of paper.

7. The image forming apparatus of claim 1, wherein the at least one print setting specifies a position on a sheet of paper where the publicized information is to be printed.

8. A publicized information aggregating apparatus comprising:
a keyword storage portion that stores a keyword specified by a user;
a retrieving portion that retrieves, from information publicized through a server, publicized information that includes updated or newly added contents and that also includes the keyword stored in the keyword storage portion; and
a file generation portion that bundles together into a single file a plurality of pieces of the publicized information that have been retrieved by the retrieving portion during a predetermined period.

9. The publicized information aggregating apparatus of claim 8, wherein the predetermined period is specified by the user.

10. An image forming apparatus comprising:
a keyword storage portion that stores a keyword specified by a user;
a determination portion that determines whether or not first publicized information which is information publicized through a first server has been changed to include the keyword stored in the keyword storage portion; and
a printing portion that prints second publicized information which is information publicized through a second server when the determination portion determines that the first publicized information has been changed to include the keyword.

11. The image forming apparatus according to claim 10, further comprising a second keyword storage portion that stores a second keyword specified by the user,
wherein the printing portion prints the second publicized information that includes the second keyword stored in the second keyword storage portion.

12. A printing method for printing publicized information, which is information publicized through a server, by using a printer, a storage, and a CPU, the method comprising:
storing a keyword specified by a user in the storage;
causing the CPU to perform a process of retrieving, from the information publicized through the server, publicized information that includes updated or newly added contents and that also includes the keyword stored in the storage;
storing, in the storage, at least one print setting specified by the user prior to the retrieval of the publicized information by the CPU, the at least one print setting indicating a manner in which the publicized information is to be printed; and
causing the printer to perform a process of printing the publicized information thus retrieved by the CPU according to the at least one print setting stored in the storage.

13. The printing method of claim 12, further comprising causing a scanner to optically read a document image from a paper document, wherein the printer prints the document image read by the scanner on an identical sheet of paper on which the publicized information is printed.

14. The printing method of claim 12, wherein the at least one print setting specifies a position on a sheet of paper where the publicized information is to be printed.

15. A publicized information aggregating method for aggregating publicized information, which is information publicized through a server, by using a storage and a CPU, the method comprising:
storing a keyword specified by a user in the storage; and
causing the CPU to perform:
a process of retrieving, from the information publicized through the server, publicized information that includes updated or newly added contents and that also includes the keyword stored in the storage, and
a process of bundling together into a single file a plurality of pieces of the publicized information that have been retrieved by the CPU during a predetermined period.

16. The publicized information aggregating method of claim 15, wherein the predetermined period is specified by the user.

17. A printing method for printing a first publicized information, which is information publicized through a first server, by using a printer, a storage, and a CPU, the method comprising:
storing a keyword specified by a user in the storage;
causing the CPU to perform a process of determining whether or not second publicized information which is information publicized through a second server has been changed to include the keyword stored in the storage; and
causing the printer to perform a process of printing the first publicized information when the CPU determines that the second publicized information has been changed to include the keyword.

18. A non-transitory computer-readable storage medium storing thereon a computer program used for an image forming apparatus including a printer, a storage, and a CPU, the computer program causing the CPU to perform:
storing a keyword specified by a user in the storage;
retrieving, from information publicized through a server, publicized information that includes updated or newly added contents and that also includes the keyword stored in the storage;
storing, in the storage, at least one print setting specified by the user prior to the retrieval of the publicized information by the CPU, the at least one print setting indicating a manner in which the publicized information is to be printed; and
controlling the printer to print the publicized information thus retrieved according to the at least one print setting stored in the storage.

19. The program of claim 18, further comprising causing a scanner to optically reading a document image from a paper document, wherein the printer prints the document image read by the scanner on an identical sheet of paper on which the publicized information is printed.

20. The program of claim 18, wherein the at least one print setting specifies a position on a sheet of paper where the publicized information is to be printed.

21. A non-transitory computer-readable storage medium storing thereon a computer program used for a computer including a storage and a CPU, the computer program causing the CPU to perform:
  storing a keyword specified by a user in the storage;
  retrieving, from information publicized through a server, publicized information that includes updated or newly added contents and that also includes the keyword stored in the storage; and
  bundling together a plurality of pieces of the publicized information thus retrieved during a predetermined period into a single file.

22. A non-transitory computer-readable storage medium storing thereon a computer program used for an image forming apparatus including a printer, a storage, and a CPU, the computer program causing the CPU to perform:
  storing a keyword specified by a user in the storage;
  determining whether or not first publicized information which is information publicized through a first server has been changed to include the keyword stored in the storage; and
  controlling the printer to print second publicized information which is information publicized through a second server when it is determined that the first publicized information has been changed to include the keyword.

23. The program of claim 21, wherein the predetermined period is specified by the user.

* * * * *